(12) United States Patent
Ishihara

(10) Patent No.: US 7,768,505 B2
(45) Date of Patent: Aug. 3, 2010

(54) INDICATED POSITION RECOGNIZING APPARATUS AND INFORMATION INPUT APPARATUS HAVING SAME

(75) Inventor: Keiichiro Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 754 days.

(21) Appl. No.: 11/365,581

(22) Filed: Feb. 28, 2006

(65) Prior Publication Data

US 2006/0221063 A1    Oct. 5, 2006

(30) Foreign Application Priority Data

Mar. 29, 2005    (JP)    ............... 2005-095746

(51) Int. Cl.
*G06F 3/042* (2006.01)
(52) U.S. Cl. .................. 345/175; 345/173; 345/168; 345/156; 345/158; 178/18.09; 178/18.11
(58) Field of Classification Search .............. 345/102, 345/170
See application file for complete search history.

(56) References Cited

U.S. PATENT DOCUMENTS

| | | | | |
|---|---|---|---|---|
| 4,642,422 A * | 2/1987 | Garwin et al. | ............ | 178/18.02 |
| 4,772,763 A * | 9/1988 | Garwin et al. | ............. | 345/175 |
| 4,902,127 A * | 2/1990 | Byer et al. | ................. | 356/28.5 |
| 4,975,691 A * | 12/1990 | Lee | ............... | 345/79 |
| 5,138,304 A * | 8/1992 | Bronson | .................... | 345/157 |
| 5,235,363 A | 8/1993 | Vogeley et al. | | |
| 5,422,693 A | 6/1995 | Vogeley et al. | | |
| 5,525,764 A * | 6/1996 | Junkins et al. | ............... | 345/156 |
| 5,528,263 A * | 6/1996 | Platzker et al. | .............. | 345/156 |
| 5,682,181 A * | 10/1997 | Nguyen et al. | .............. | 345/158 |
| 5,900,863 A * | 5/1999 | Numazaki | .................... | 345/158 |
| 6,323,942 B1 * | 11/2001 | Bamji | ....................... | 356/5.01 |
| 6,567,078 B2 | 5/2003 | Ogawa | | |
| 6,603,588 B2 * | 8/2003 | Hagelin et al. | ........... | 359/199.3 |
| 6,614,422 B1 * | 9/2003 | Rafii et al. | ................... | 345/168 |
| 6,657,706 B2 * | 12/2003 | Levine et al. | ............. | 356/5.01 |
| 6,710,770 B2 * | 3/2004 | Tomasi et al. | ............... | 345/168 |
| 7,307,661 B2 * | 12/2007 | Lieberman et al. | ......... | 345/158 |
| 2001/0002694 A1 * | 6/2001 | Nakazawa et al. | ......... | 345/175 |
| 2002/0024676 A1 | 2/2002 | Fukuzaki | | |

(Continued)

FOREIGN PATENT DOCUMENTS

EP    1100040 A2    5/2001

(Continued)

*Primary Examiner*—Richard Hjerpe
*Assistant Examiner*—Dorothy Webb
(74) *Attorney, Agent, or Firm*—Canon U.S.A., Inc. I.P. Division

(57) ABSTRACT

At least one exemplary embodiment is directed to an image displaying apparatus, which includes a drawing-light-beam projecting unit, a scanning device, an indicating device, a light receiving device, and a position detecting device. The drawing-light-beam projecting unit projects a visible drawing light beam. The scanning device can two-dimensionally scan visible light and invisible light on a surface to be scanned. The indicating device can indicate any position on the surface to be scanned. The light receiving device can receive invisible light deflected by the indicating device and obtain a light receiving timing. The position detecting device can obtain the position indicated by the indicating device in an image projected by the drawing-light-beam projecting unit, on the basis of the light receiving timing.

12 Claims, 19 Drawing Sheets

U.S. PATENT DOCUMENTS

| | | | |
|---|---|---|---|
| 2002/0061217 A1* | 5/2002 | Hillman et al. | 400/489 |
| 2002/0075240 A1* | 6/2002 | Lieberman et al. | 345/170 |
| 2002/0125325 A1* | 9/2002 | Plesko | 235/462.49 |
| 2003/0095109 A1* | 5/2003 | Sasaki et al. | 345/173 |
| 2003/0128190 A1* | 7/2003 | Wilbrink et al. | 345/169 |
| 2003/0132921 A1* | 7/2003 | Torunoglu et al. | 345/173 |
| 2004/0069934 A1* | 4/2004 | Hendriks et al. | 250/221 |
| 2004/0104894 A1 | 6/2004 | Tsukada | |
| 2005/0224582 A1* | 10/2005 | Aiki et al. | 235/472.01 |
| 2007/0046625 A1* | 3/2007 | Yee | 345/156 |

FOREIGN PATENT DOCUMENTS

| | | |
|---|---|---|
| JP | 04-219712 A | 8/1992 |
| JP | 05-224636 A | 9/1993 |
| JP | 8-36452 A | 2/1996 |
| JP | 09-034642 A | 2/1997 |
| JP | 11-84291 A | 3/1999 |
| JP | 2000-222127 A | 8/2000 |
| JP | 2001-56749 A | 2/2001 |
| JP | 2001-142630 A | 5/2001 |
| JP | 2001-209487 A | 8/2001 |
| JP | 2001-281583 A | 10/2001 |
| JP | 2002-062979 A | 2/2002 |
| JP | 2002-091686 A | 3/2002 |
| JP | 2002-268808 A | 9/2002 |
| JP | 2003-122477 A | 4/2003 |
| JP | 2004-185258 A | 7/2004 |
| JP | 2005-148773 A | 6/2005 |
| WO | WO 2004003656 A2 * | 1/2004 |

* cited by examiner

INDICATED POSITION RECOGNIZING APPARATUS AND INFORMATION INPUT APPARATUS HAVING SAME

BACKGROUND OF THE INVENTION

1. Field of the Invention

The present invention relates to an indicated position recognizing apparatus and an information input apparatus having the same.

2. Description of the Related Art

Conventional systems have developed handwriting information input systems where characters, image information, and so on are written on a screen using an input pen. The handwritten information is digitized, and the information is displayed on the screen, and various apparatuses have been proposed.

A writing pen apparatus proposed in Japanese Patent Laid-Open No. 8-36452 (Patent Document 1) includes a writing pen and a sheet of writing paper. The sheet has a pattern such that the sheet's reflecting characteristic varies. The writing pen detects the difference in the reflecting characteristic of the pattern on the sheet, thereby detecting the motion of the writing pen and the coordinate.

In a handwritten information input system proposed in Japanese Patent Laid-Open No. 2001-56749 (Patent Document 2), two predetermined floodlight units form, by projecting light beams, a coordinate-indicating area, where the coordinate-indicating area is substantially the same as an information-displaying surface of the recording medium. On the basis of the distance between the floodlight units, the optical output values of the light beams emitted from the light sources are changed. In this way, the positional information of a locus, handwritten using a writing device on the information-displaying surface of the recording medium, can be detected regardless of the size of the recording medium.

There have been proposed various optical scanning apparatuses such that a light beam emitted from a light source device forms a spot on a surface to be scanned, a scanning device two-dimensionally scans the light beam on the surface to be scanned, and a two-dimensional image is formed by the afterimage effect (Japanese Patent Laid-Open Nos. 2001-281583 and 11-84291 (Patent Documents 3 and 4)).

In the writing pen apparatus described in Patent Document 1, it is necessary to set a pattern such that the reflecting characteristic is gradually changed, on a sheet of writing paper, and it is necessary to always carry the sheet of writing paper.

In the handwritten information input system described in Patent Document 2, it is necessary to highly accurately dispose the two floodlight units with respect to the coordinate of the writing area.

The apparatuses of Patent Documents 1 and 2 are apparatuses for obtaining the information handwritten on paper, and do not project and display an image on a predetermined surface for themselves.

SUMMARY OF THE INVENTION

At least one exemplary embodiment is directed to an information input system and an input-information displaying system that uses a scanning image-displaying apparatus. The scanning image-displaying apparatus can optically scan a drawing light beam with a scanning device, thereby displaying image information (a scanning image) on a screen. The drawing light beam can be emitted from a light source device and optically modulated on the basis of the image information.

At least one exemplary embodiment is directed to an information input and output apparatus which can obtain at least one of the following:

(1) an indicated-position recognizing apparatus and an information input and output apparatus capable of detecting a position indicated by an indicating device in a projected and displayed image; (2) an information input and output apparatus capable of displaying new image information in the displayed image information on the basis of input information; (3) a compact information input and output apparatus which integrates an image displaying apparatus, that displays image information, with an information input apparatus that detects a position indicated by an indicating device in an image; and (4) an information input apparatus capable of detecting a position indicated by an indicating device without adding any new indicated-position detecting devices for detecting the indicated position, or regardless of the disposition of the indicated-position detecting devices.

At least one further exemplary embodiment is directed to an indicated-position recognizing apparatus which includes a scanning device, a light receiving device, and a position detecting device. The scanning device two-dimensionally scans invisible light on a surface to be scanned. The light receiving device receives invisible light deflected by an indicating device that indicates any position on the surface to be scanned. The position detecting device obtains an area on the surface to be scanned indicated by the indicating device, on the basis of the light receiving timing when the light receiving device receives the invisible light deflected by the indicating device.

The position detecting device can obtain the position on the surface to be scanned, indicated by the indicating device, which can use the detection time from the generation of a reference synchronization signal to the light receiving timing when the light receiving device receives the reflected light.

A second exemplary embodiment is directed to an image displaying apparatus which includes a scanning device, an indicating device, a light receiving device, a drawing-light-beam projecting unit, and a position detecting device. The scanning device two-dimensionally scans invisible light on a surface to be scanned. The indicating device indicates any position on the surface to be scanned. The light receiving device receives invisible light deflected by the indicating device. The drawing-light-beam projecting unit projects a visible drawing light beam modulated on the basis of image information onto the surface to be scanned. The position detecting device obtains the position indicated by the indicating device in an image projected by the drawing-light-beam projecting unit, on the basis of the light-receiving timing when the light receiving device receives the invisible light deflected by the indicating device.

At least one exemplary embodiment is directed to an image displaying apparatus which includes a drawing-light-beam projecting unit, a scanning device, an indicating device, and a light receiving device. The drawing-light-beam projecting unit projects an image onto a surface to be scanned using a visible drawing light beam modulated on the basis of image information. The scanning device two-dimensionally scans invisible light on the surface to be scanned. The indicating device indicates any position on the surface to be scanned. The light receiving device receives invisible light deflected by the indicating device. A predetermined image is displayed at the position indicated by the indicating device in the surface to be scanned, by modulating the drawing light beam corresponding to the position indicated by the indicating device, on the basis of the light receiving timing when the light receiving device receives the invisible light deflected by the indicating device.

At least one further exemplary embodiment is directed to a scanning image-displaying apparatus which can include a determination device that determines whether the position obtained by the position detecting device is within a specific area.

In at least one further exemplary embodiment, the scanning device can two-dimensionally scan the drawing light beam emitted from the drawing-light-beam projecting unit on the surface to be scanned.

In yet a further exemplary embodiment, an image displaying apparatus includes a drawing-light-beam projecting unit, a scanning device, an indicating device, a light receiving device, and a position detecting device. The drawing-light-beam projecting unit projects a visible drawing light beam modulated on the basis of image information. The scanning device two-dimensionally scans visible light emitted from the drawing-light-beam projecting unit and invisible light on a surface to be scanned. The indicating device indicates any position on the surface to be scanned. The light receiving device receives invisible light deflected by the indicating device. The position detecting device obtains the position indicated by the indicating device in an image projected by the drawing-light-beam projecting unit, on the basis of the light receiving timing when the light receiving device receives the invisible light deflected by the indicating device.

The image information can be controlled in the timing synchronized with the light receiving timing.

In at least one exemplary embodiment, the image displaying apparatus can further include a device that measures the time from generation of a reference synchronization signal to the light receiving timing. The reference synchronization signal can serve as a standard for forming an image on the surface to be scanned.

In at least one exemplary embodiment, the invisible light may be infrared light that has a peak wavelength in a range from 1.4 µm to 1.6 µm.

In at least one further exemplary embodiment, the invisible light may be eye-safe light.

In at least one exemplary embodiment, the indicating device can include a mechanism that selects either to deflect or not to deflect incident light in a direction opposite to the direction of incidence.

In at least one further exemplary embodiment, the indicating device can include a retro-reflecting member that reflects incident light in a direction opposite to the direction of incidence.

In at least one exemplary embodiment, the drawing-light-beam projecting unit can include light sources that radiate red light, blue light, and green light, and the scanning device can scan the three color lights on the surface to be scanned so as to display a color image.

In at least one exemplary embodiment, the scanning direction of the scanning device can be configured to be inverted.

In at least one exemplary embodiment, the image displaying apparatus can further include a changing device capable of changing the direction in which the scanning device scans the surface to be scanned.

In at least one exemplary embodiment, the image displaying apparatus can further include a device that shifts the timing when the drawing light beam is projected by half of a scanning cycle in the main scanning direction of the scanning device.

At least one exemplary embodiment can highly accurately detect a position indicated by an indicating device and/or can accurately display a predetermined image at a position indicated by an indicating device, in a projected and displayed image.

Further features of the present invention will become apparent from the following description of exemplary embodiments (with reference to the attached drawings).

DESCRIPTION OF THE EMBODIMENTS

Figure 1A:
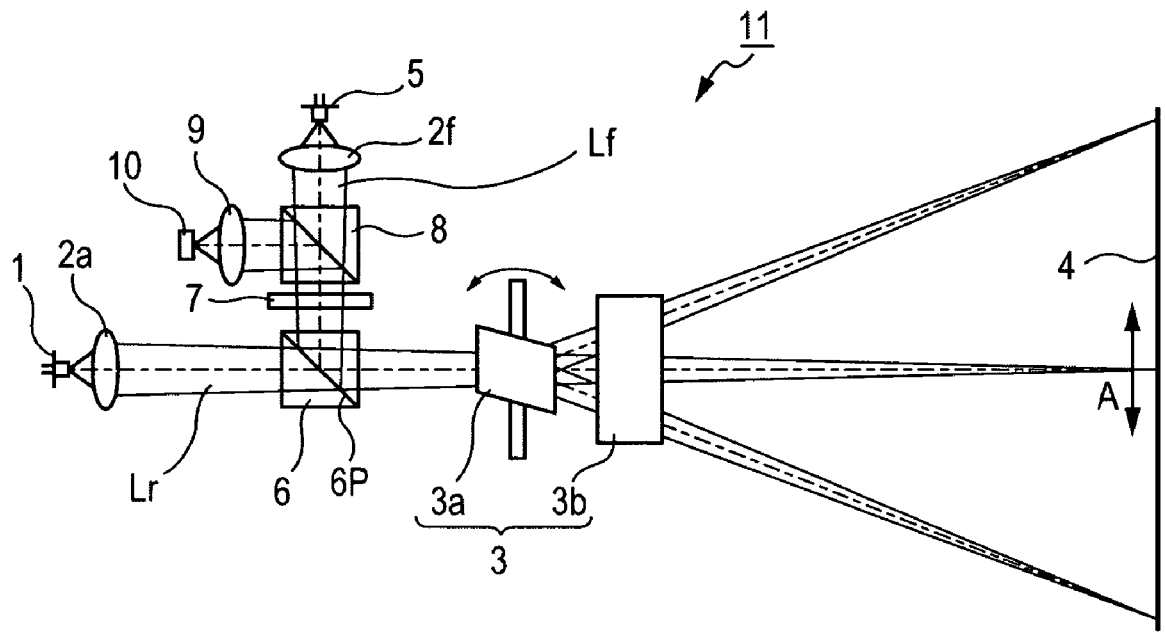
FIGS. 1A and 1B are sectional views of the main part of an information input and output apparatus in accordance with exemplary embodiment 1.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example projector lens assemblies, and reflected light detection devices.

Notice that similar reference numerals and letters refer to similar items in the following figures, and thus once an item is defined in one figure, it may not be discussed for following figures.

Exemplary embodiments will be hereinafter described in detail.

Exemplary Embodiment 1

Figure 1B:
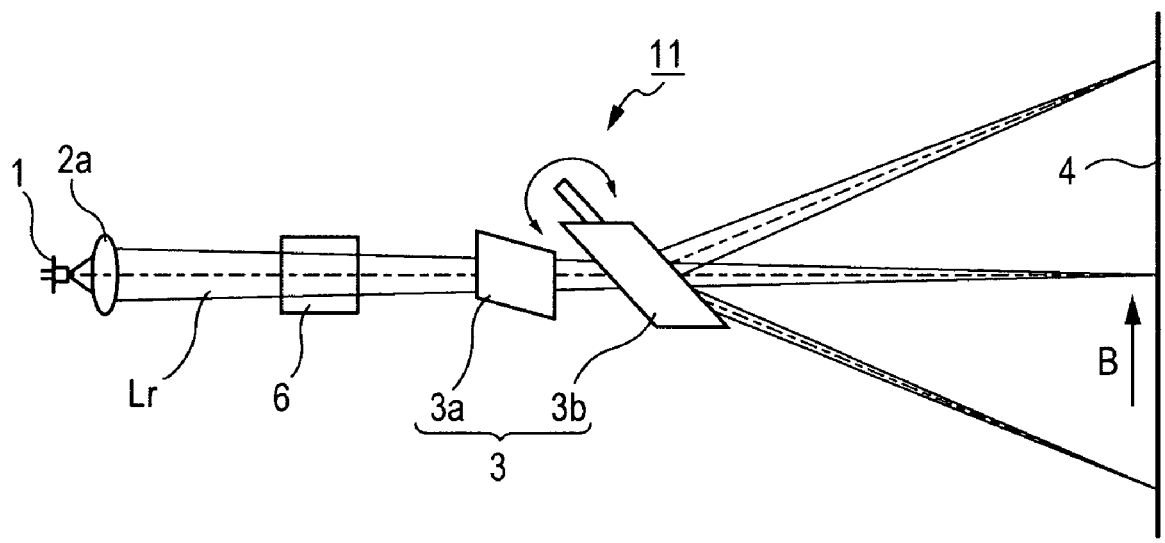

FIGS. 1A and 1B are a horizontal sectional view and a vertical sectional view, respectively, of the main part of a scanning information input and output apparatus (scanning image-displaying apparatus) 11 that has an indicated-position recognizing apparatus according to exemplary embodiment 1.

In the present exemplary embodiment, when the user indicates an area on a surface to be scanned (screen surface) 4 with an indicating device, the area is detected by a position detecting device using the light receiving timing when a light receiving device receives light. On the basis of the detection time determined by the position detecting device, an image is created in the area.

In FIGS. 1A and 1B, reference numeral 1 denotes a light source device for drawing, for example, a semiconductor laser that radiates red light (visible light) on the basis of image information. A light beam Lr emitted from the light source device 1 for drawing is collected by a collecting lens 2a so as to form a spot image on a below-described screen 4 through a combining unit 6 and a scanning device 3. The scanning device (deflecting device) 3 can be a two-dimensional scanning device including a deflector 3a that scans in the horizontal direction and a deflector 3b that scans in the vertical direction. The deflector 3a can be a deflector that oscillates by resonance, for example, a MEMS (Micro Electro-Mechanical System) device. The deflector 3b can be a deflector that moves at a constant angular velocity and then returns to the original position (saw-tooth wave movement), for example, a scanner mirror driven by a motor. The deflector 3b need not move at a constant angular velocity. The deflector 3b can resonate like a MEMS. Alternatively, the deflector 3b can be driven so as to rotate fast in the middle of the angle of view and rotate relatively slowly in the vicinities of the ends of the angle of view.

After passing through the collecting lens 2a, the light beam Lr passes through a below-described combining unit 6 and is reflected and/or deflected by the scanning device 3 so that the screen 4 (the surface to be scanned) is optically scanned. In the horizontal direction, the screen 4 is scanned in the direction of arrow A at a high speed and scanning lines are formed. In the vertical direction, the screen 4 is scanned in the direction of arrow B at a low speed compared with the speed in the direction of arrow A. In this way, a two-dimensional scanning image is formed on the screen 4. The light beam emitted from the light source device 1 can be optically modulated according to video signals so as to display an image. In further exemplary embodiments, the direction and speeds of scanning can vary and any discussion of examples herein are non limiting.

Reference numeral 5 denotes a light source device for position detection (e.g., an invisible light source device), for example, an infrared semiconductor laser that radiates invisible infrared light. Ultraviolet light can also be used as invisible light. A position detecting light beam Lf emitted from the light source device 5 is collected by a collecting lens 2f, passes through below-described members, and forms a spot image on the screen 4. After passing through the collecting lens 2f, the light beam Lf passes through a polarizing beam splitter (hereinafter referred to as PBS) 8 and a quarter-wave plate 7. The light beam Lf then enters the combining unit 6 (for example, a dichroic prism) and is reflected by a dichroic surface 6P so as to be combined with the drawing light beam Lr. Thereafter, the light beam Lf travels along the same optical path as the drawing light beam Lr and is deflected by the scanning device 3 in the two-dimensional direction so that the screen 4 is optically scanned.

The drawing light source device 1 is a drawing-light-beam radiating device, a drawing-light-beam projecting unit, or a device for radiating or projecting a drawing light beam for drawing an image (in other words, an image light beam for forming an image). Note that in at least one exemplary embodiment the drawing light source device 1 and/or the light source device for position detection 5 emits multiple wavelengths of light, some of which can be used as a drawing light source and others that can be used as a light source device for positioning, thus a single light source device can supply both light beams Lr and Lf. The invisible light source device 5 can be a device for radiating invisible light that is out of the visible range. A light receiving device 10 is capable of receiving and detecting the invisible light. The drawing light source device 1, the invisible light source device 5, the scanning device 3, and the light receiving device 10 are housed in a case. In at least one exemplary embodiment, the light receiving device 10 can be separated from the other devices, for example in at least one exemplary embodiment the light receiving device is not housed in the case.

Figure 2:
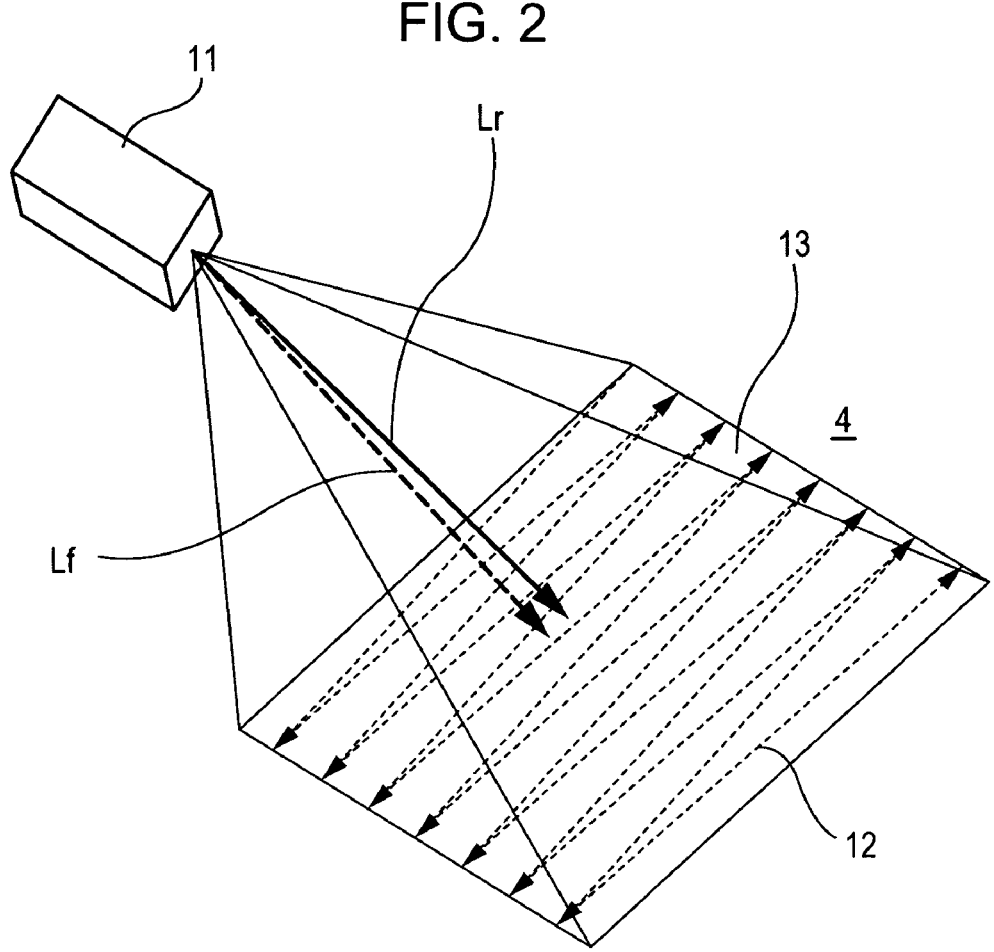
FIG. 2 is a schematic view of the information input and output apparatus in accordance with exemplary embodiment 1.

FIG. 2 is a schematic view of an image forming apparatus using the scanning information input and output apparatus of FIGS. 1A and 1B.

In FIG. 2, the screen 4 is the top surface of a desk.

In FIG. 2, the information input and output apparatus 11 two-dimensionally scans the screen 4 with the drawing light beam Lr, thereby forming many scanning lines so as to display a scanning image 13.

The position detecting light beam Lf is combined with the drawing light beam Lr, and the light beams Lf and Lr optically scan the same position (area) on the screen 4.

The position detecting light beam Lf can be invisible, for example it can be an infrared laser beam that has a peak wavelength in a range from 1.4 μm to 1.6 μm. Therefore in this particular non-limiting example, the position detecting light beam Lf does not affect the scanning image displayed with the drawing light beam Lr.

Specifically in the example illustrated, an infrared laser can be used whose wavelength band is 1.5 μm which is called eye-safe light and is characterized in that it is easily absorbed by water. Note that other frequencies are also eye-safe and the discussion herein should not be interpreted as being limitative of the particular wavelengths that can be used. If the eye-safe light is incident on the human eye, it can be absorbed by tears, and safety is ensured. Therefore, the eye-safe light is ideal for the position detecting light beam Lf.

The position detecting light beam Lf is not necessarily combined with the drawing light beam Lr before scanning the screen. The position detecting light beam Lf can be led to the screen through an optical path different from the optical path of the drawing light beam Lr. Of course as discussed above, the light receiving device can be separated from the drawing light source device.

Figure 3:
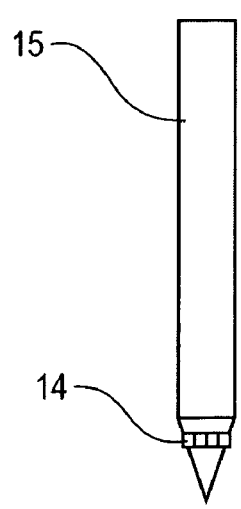
FIG. 3 illustrates an indicating device in accordance with exemplary embodiment 1.

FIG. 3 illustrates an indicating device 15 used in the present exemplary embodiment.

In order to facilitate obtaining handwritten information, one can accurately obtain the position on the screen 4 indicated by the indicating device 15. For convenience of illustration, the term "position" here designates a position on the screen surface. However, in the case where an image is displayed by two-dimensional scanning (or one-dimensional scanning), the term "position" can designate a temporal area (timing). The position (temporal area) does not designate a point, and it can designate an area (spatial area, temporal area). The term "handwritten information" here designates a locus of the indicating device on the surface to be scanned when the indicating device is ON. In other words, it corresponds to accumulated information of timing (time) when the invisible infrared light deflected by the indicating device is received by the light receiving device. The indicating device can be turned ON by pressing the tip of the indicating device against the surface to be scanned (for example, a screen) as shown in FIGS. 4B to 4D. Alternatively, the indicating device may be turned ON by a switch that controls ON/OFF of the indicating device.

In the present exemplary embodiment, the position on the surface to be scanned indicated by the indicating device 15 can be identified by detecting the light receiving timing when the light receiving device 10 receives the reflected light beam.

In the present exemplary embodiment, retro-reflecting members 14 can be provided around the tip of the indicating device 15. Each retro-reflecting member 14 returns incident light to the incident optical path or an optical path in its vicinity (retro-reflection). However, in the case where an invisible-light receiver is provided inside a scanning information input and output apparatus 11 that projects light based on image information, any type of recursiveness will suffice. The term "recursiveness" designates a characteristic such that a light beam emitted from the scanning information input and output apparatus 11 is deflected and returned to the scanning information input and output apparatus 11. The term "deflect" means that the traveling direction of light changes due to reflection and/or refraction and/or diffraction. Therefore, the light emitted from the scanning information input and output apparatus 11 need not be reflected by the indicating device. The light can be refracted and/or diffracted by the indicating device and returned to the scanning information input and output apparatus 11. In the case where the light receiver (light receiving device) is provided separately from the scanning information input and output apparatus 11, recursiveness is not necessary. The light emitted from the scanning information input and output apparatus 11 only has to be deflected by the indicating device so as to be received by the light receiver.

Specifically in the non limiting example illustrated, the retro-reflecting members 14 can be corner cubes. A corner cube 14 is characterized in that an incident light beam is reflected several times in the inside and is then returned to the incident direction. Therefore, in the case where the position detecting light beam Lf coming out of the scanning information input and output apparatus 11 is incident on one of the corner cubes 14, the light beam Lf can be returned to the scanning information input and output apparatus 11.

The position detecting light beam Lf returned to the information input and output apparatus 11 passes through the scanning device 3, the combining unit 6, the λ/4 plate 7, the PBS 8, and a collecting lens 9, and is then detected by the light receiving element 10.

However, even when retro-reflection is performed, the position indicated by the indicating device 15 may not be always accurately detected.

The selective detection of the position indicated by the indicating device 15 will be described with reference to FIGS. 4A and 4B.

Figure 4A:
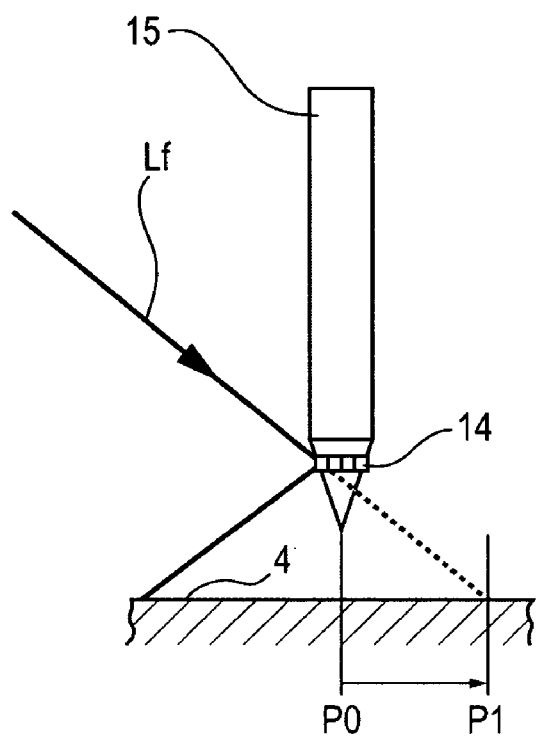
FIGS. 4A to 4D illustrate selective indicated-position detecting mechanisms provided in the indicating device.
Figure 4B:
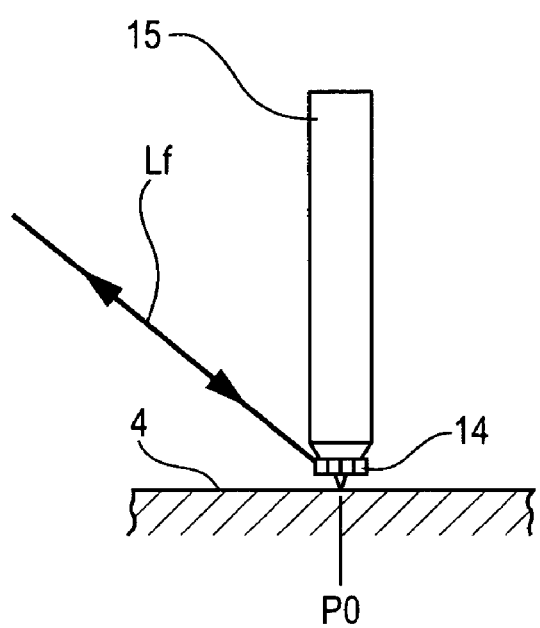
Figure 4C:
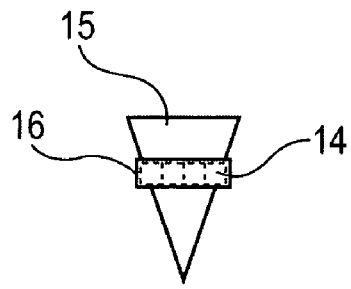
Figure 4D:
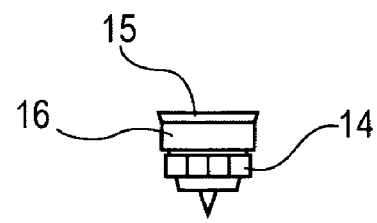

FIG. 4A illustrates an OFF state in which retro-reflection is not performed by the indicating device 15. FIG. 4B illustrates an ON state in which retro-reflection is performed. FIG. 4C illustrates the tip of the indicating device 15 in accordance with at least one exemplary embodiment in the OFF state of retro-reflection. FIG. 4D illustrates the tip of the indicating device 15 in the ON state of retro-reflection.

In FIG. 4A, the indicating device 15 is going to indicate a point P0 on the screen 4. However, the scanning position detected on the basis of the position detecting light beam Lf retro-reflected by one of the corner cubes 14 is P1. As a result, the position indicated by the indicating device 15 may not be accurately detected, with the accuracy varying depending upon how close the indicating device is to the screen 4.

To solve this problem, in the present exemplary embodiment, a selective indicated-position detecting mechanism is provided so that retro-reflection can be performed on one of the retro-reflecting members 14 only when the position indicated by the indicating device 15 can be accurately detected.

That is to say, the indicating device 15 includes a selective indicated-position detecting mechanism (shutter device) that selects whether to allow the incident light to be reflected in the same direction as the incident direction or not.

As shown in FIG. 4A, when the indicating device 15 is in the air, the indicated position on the screen 4 may not be accurately detected. To solve this problem, as shown in FIG. 4C, a shutter 16 for covering the retro-reflecting members (corner cubes) 4 is provided. The shutter 16 is closed, thereby reflecting the incident position-detecting light beam Lf. Therefore, retro-reflection is not performed. The position detecting light beam Lf does not return to the information input and output apparatus 11, and the position indicated by the indicating device 15 is not detected.

On the other hand, as shown in FIG. 4B, when the tip of the indicating device 15 is located in the vicinity of the screen 4, the indicated position can be accurately detected. In the present exemplary embodiment, when the indicating device 15 is pressed against the screen 4, the tip is retracted. It thereby turns out that the tip is located in the vicinity of the screen 4.

Therefore, as shown in FIG. 4D, when the indicating device 15 is pressed against the screen 4 and the tip is retracted, the shutter 16 covering the retro-reflecting members (corner cube) 14 is opened so that the position detecting light beam Lf is incident on one of the corner cubes. As a result, retro-reflection is performed in the corner cube 14, and the position detecting light beam Lf returns to the scanning information input and output apparatus 11. Therefore, by detecting this light beam Lf, the position indicated by the indicating device 15 is detected.

As described above, in the selective indicated-position detecting mechanism, the vertical movement of the tip of the indicating device 15 is interlocked with the vertical movement of the shutter 16. By providing such a selective indicated-position detecting mechanism, selective indicated-position detection can be performed, that is to say, retro-reflection can be performed when the user indicates with the indicating device 15, and therefore the position on the screen 4 indicated with the indicating device 15 can be accurately detected.

As described above with reference to FIGS. 4A to 4D, pressing the tip of the indicating device against the surface to be scanned (for example, a screen) opens the shutter, thereby deflecting (reflecting) infrared light toward the light receiving device. However, of course, in other exemplary embodiment, the shutter is not necessary. Alternatively, a switch that controls ON/OFF of the indicating device can be provided in the body of the scanning information input and output apparatus of the present exemplary embodiment so as to open/close a shutter provided in the light receiving device. Alternatively, it is possible to modulate the image to be projected, on the basis of the infrared light received by the light receiving device, only when the indicating device is ON. Alternatively, as will be described below with reference to FIGS. 19A and 19B, ON/OFF of the indicating device can be controlled with a switch provided in a position other than the tip of the indicating device.

The indicated-position recognizing apparatus included in the information input and output apparatus 11 of the present exemplary embodiment includes the light source device 5, the scanning device 3, the light receiving device 10, and a position detecting device. The light source device 5 can radiate invisible light. The scanning device 3 two-dimensionally scans the surface 4 to be scanned with invisible light emitted from the light source device 5. The indicating device 15 indicates a position on the surface to be scanned. The light receiving device 10 receives the infrared light that is scanned by the scanning device 3 and reflected by a part of the indicating device 15. The position detecting device obtains the position on the surface 4 to be scanned indicated by the indicating device 15, on the basis of the light receiving timing when the light receiving device 10 receives the reflected light.

Figure 5:
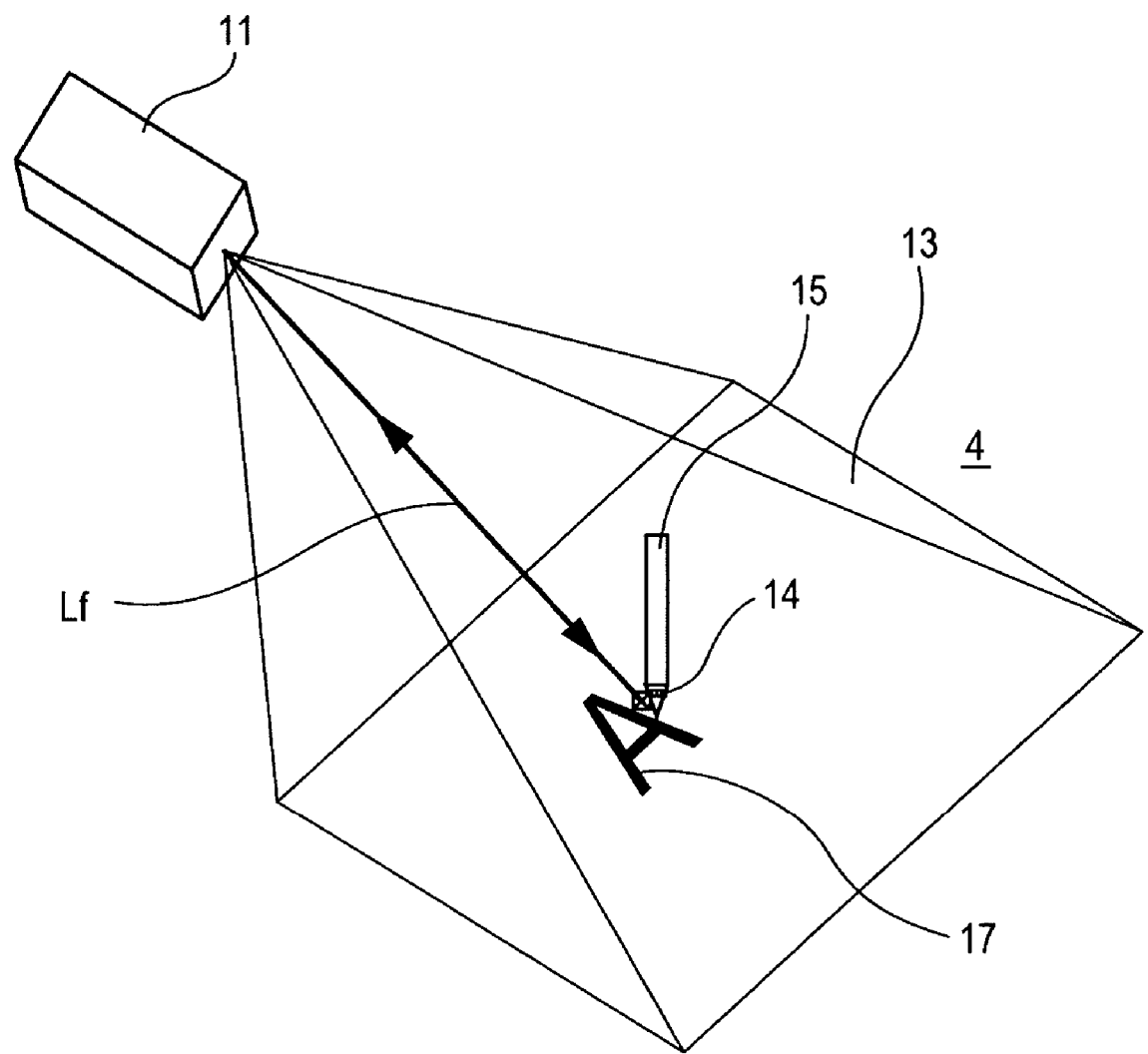
FIG. 5 illustrates a method in accordance with at least one exemplary embodiment for obtaining handwritten information.

FIG. 5 illustrates a method for obtaining handwritten information on the screen 4.

When a position in the scanning image 13 on the screen 4 is indicated with the indicating device 15, the position detecting light beam Lf incident on one of the corner cubes 14 retraces the original optical path and returns to the information input and output apparatus 11. The light beam Lf is then reflected by the scanning device 3 shown in FIG. 1A, is reflected by the dichroic prism 6, and is incident on the PBS 8 through the quarter-wave plate 7. Since the light beam Lf passes through the quarter-wave plate 7 twice (outward and homeward), the polarizing direction is changed from the S-polarization to the P-polarization when the light beam Lf is incident on the PBS 8 again. Therefore, the light beam Lf is reflected by the PBS 8. The light beam reflected by the PBS 8 is collected onto the light receiving element 10 by the collecting lens 9. On the basis of the light receiving timing detected by the light receiving element 10, the time that has elapsed since the generation of the frame synchronization signal is measured. The "time" here can be a relative time. For example, the number of counts can be measured using a counter.

In the present exemplary embodiment, the frame rate of the information input and output apparatus 11 can vary, for example 60 (Hz), and the time required for displaying one frame is 1/60 (sec). The definition can vary, for example SVGA, where 800 pixels in the horizontal direction and 600 pixels in the vertical direction are displayed. That is to say, 600 scanning lines are formed in one frame, and one scanning line consists of 800 pixels. Information input and output apparatuses such as the present exemplary embodiment can draw many scanning lines to form a scanning image. Optical modulation can be performed with the scanning position and the video signal synchronized, and an image is displayed on the screen 4. That is to say, all pixels can be arranged in time series.

Figure 6:
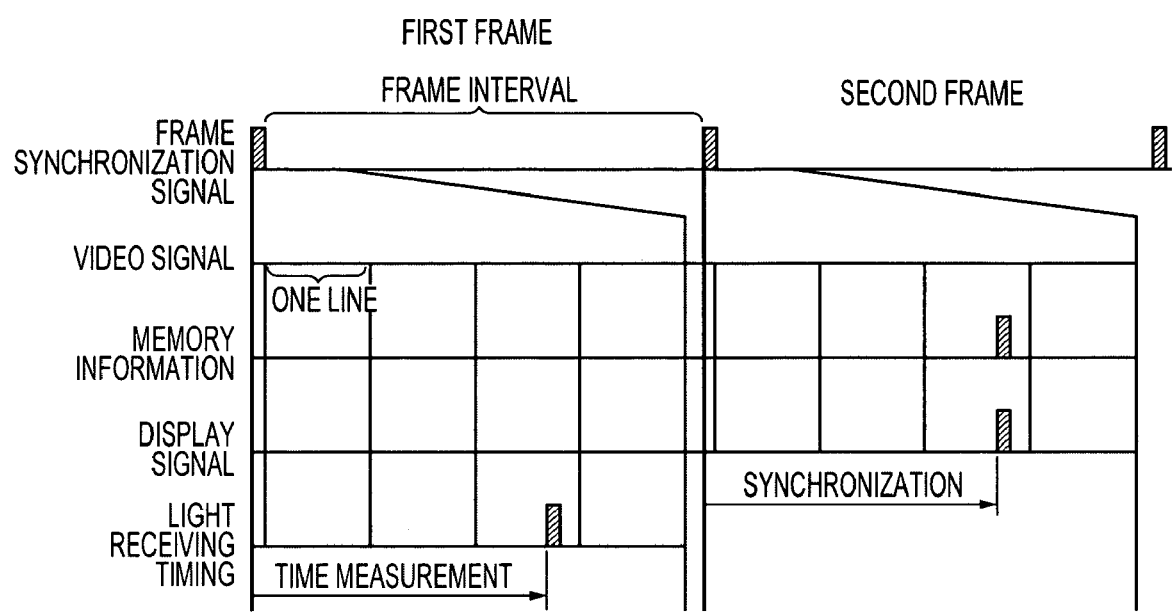
FIG. 6 illustrates the light receiving timing in accordance with exemplary embodiment 1.

FIG. 6 illustrates the light receiving timing of the light receiving element 10.

FIG. 6 shows the relationship between two cycles of frames. The frame interval is 1/60 (sec). At this interval, frame synchronization signals are generated. Although one frame includes 600 scanning lines, a part of them is shown in FIG. 6. The range shown by "ONE LINE" is the area of one scanning line.

In the first frame shown on the left side, all video signals are OFF and the drawing light beam Lr (the light source device 1 for drawing) is turned off, and an entirely black image is displayed. On the other hand, the position detecting light beam Lf (the light source device 5 for position detection) is turned on.

When the scanning light of the position detecting light beam Lf reaches a position on the screen 4 indicated by the indicating device 15, retro-reflection is performed in the indicating device 15, and the light receiving element 10 located inside the information input and output apparatus 11 receives the reflected light. This timing is the light receiving timing, which is shown by "LIGHT RECEIVING TIMING" in FIG. 6.

By measuring the time (detection time) from the frame synchronization signal of reference (reference synchronization signal) to the light receiving timing, the scanning position of the indicating device 15 on the screen 4 can be identified. Where the frame synchronization signal can be a time tag associated with the start of a scan of the screen 4 or the beginning of a repeat scan.

As described above, in the information input and output apparatus 11, the position on the screen 4 indicated by the indicating device 15 in the scanning image can be detected with the position detecting device in the information input and output apparatus by detecting the relative time (detection time) from the reference synchronization signal to the light receiving timing.

In the present exemplary embodiment, image information different from the scanning image information is displayed on the surface to be scanned, at the timing synchronized with the light receiving timing.

Next, the method for displaying handwritten information at the position indicated by the indicating device 15 will be described.

Figure 7:
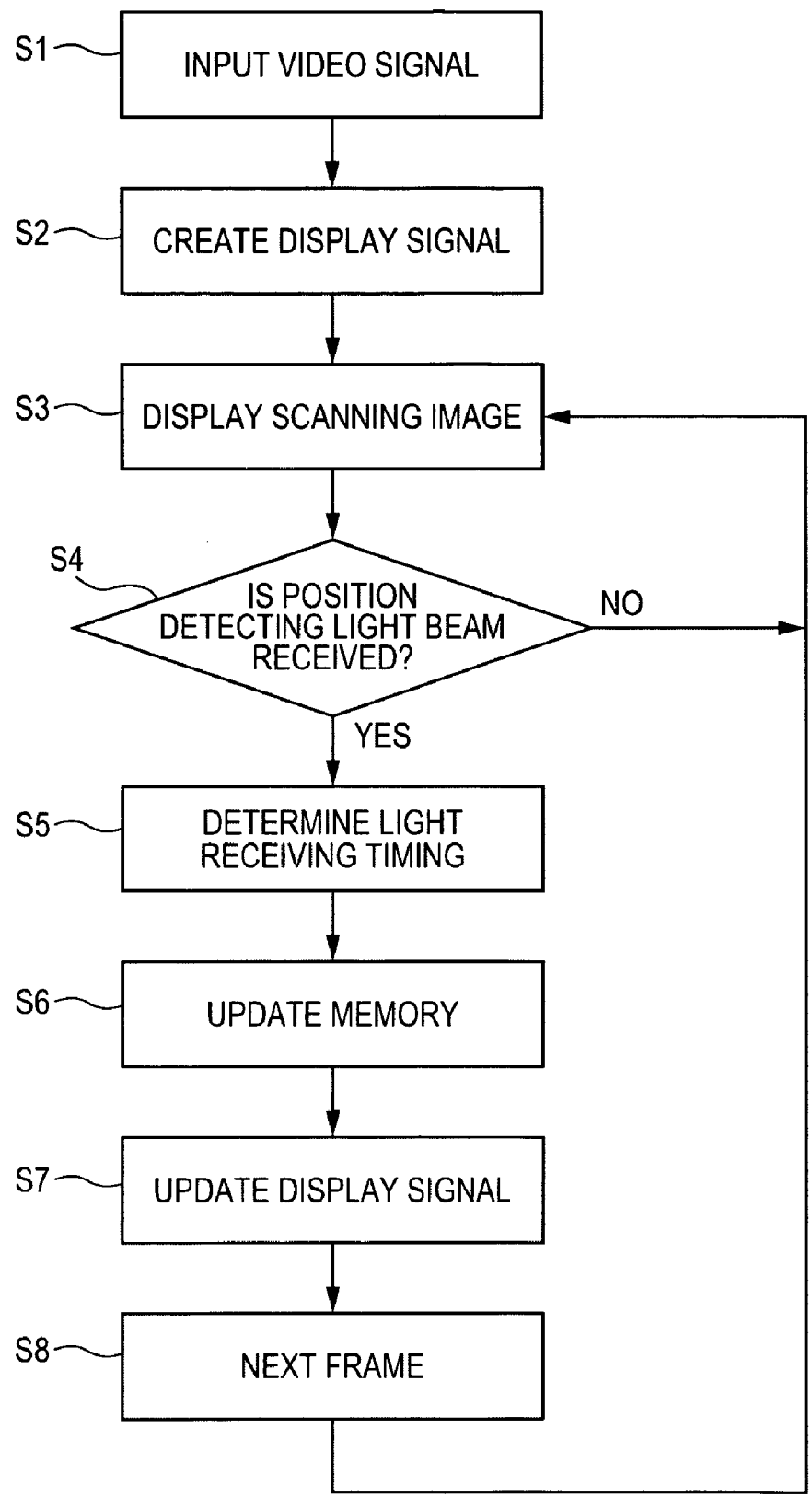
FIG. 7 is a flowchart of a method in accordance with at least one exemplary embodiment.

FIG. 7 is a flowchart for displaying handwritten information at the position indicated by the indicating device 15.

First, video signals are input (S1), and display signals are created from the video signals and the memory information (S2). All video signals are OFF at this time, and there is no memory information. Therefore, all display signals to be created are also OFF. On the basis of the display signals, the drawing light beam is optically modulated so as to display a desired scanning image (S3). In the present exemplary embodiment, it is an entirely black scanning image. On the other hand, the position detecting light beam Lf is always ON, and the entirely black scanning image is scanned with the light beam Lf.

Next, a position in the scanning image is indicated using the indicating device 15. The position detecting light beam Lf returning from one of the corner cubes of the indicating device 15 is received by the light receiving device 10 (S4). Next, the time (detection time) from the frame synchronization signal that is a reference synchronization signal to the light receiving timing is detected (S5).

The obtained detection information (detection time) is stored in the memory device (S6) in the information input and output apparatus 11. Next, the stored information is read out in the following frame (second frame), and display of handwritten information is performed. Specifically, display signals are newly created from the video signals of the following frame and the memory information. On the basis of the display signals, the drawing light beam is optically modulated. In this way, a scanning image to which handwritten information is added can be displayed (S7). The indicated-position detection is repeatedly performed (S8) to update the memory information, and the locus of the indicated position is stored. In this way, the handwritten information 17 shown in FIG. 5 can be displayed on the screen 4.

The "following frame" here includes not only the frame just after receiving of light but also any frame that follows. However, in consideration of convenience of the user, the "following frame" can be one of at most 30 frames that follow.

As described above, it is important to display the handwritten information in real-time. In conventional methods, the processing speed in the indicated-position detection is a problem.

In a conventional method in which the position is detected by obtaining the position coordinate, first, the coordinate of the indicated position is obtained. The result is stored and converted into the same kind of time-series information as the video signals. Through a process that creates display signals from the video signals and the detection information, the handwritten information is displayed. Since this method includes the process that converts the position coordinate into the time-series information, processing requires time. In contrast, in the method of the present exemplary embodiment in which the position is detected by obtaining the time (light receiving timing), the detection information is the same time-series information as the video signals. Therefore, it is not necessary to convert the position coordinate into the time-series information. Since one process can be omitted, the processing time can be reduced. As described above, from the indicated-position detection to the display of the handwritten information, time-series information can be consistently handled, and therefore processing can be simplified.

In addition, the indicated-position detection can be performed once each frame, and the detection time is very short (1/60 sec). That is to say, the process from the indicated-position detection to the display of the handwritten information can be quickly performed, facilitating the display of the handwritten information in real or near real time.

There are additional advantages to handling the same kind of detection information as the video signals. For example, in the case where a scanning image is projected onto a slope or a three-dimensional surface, in order to obtain the position coordinate, it is necessary first to grasp the shape of the projection surface and then to perform strict measurement and analysis. However, in the actual use environment, the screen is not always the same, and therefore it can be difficult to accurately grasp the shape of the projection surface. Therefore, in the conventional method in which the position coordinate is obtained, it is difficult to accurately identify the indicated position.

In the information input and output apparatus of the present exemplary embodiment, since the detection information is the same kind of time-series information as the video signals, the detection information and the video signals can be relatively handled. In addition, in the present exemplary embodiment, the drawing light beam Lr can be combined with the position detecting light beam Lf, and the same position on the screen 4 can be optically scanned with the light beams Lr and Lf at the same time. Therefore, by time synchronizing the output with the light receiving timing with respect to the reference synchronization signal (in a timing such that the time lag from the reference synchronization signal is the same), the handwritten information can be displayed at about the exact position. The reference synchronization signal need not exist separately from the image signals. For example, the image signal corresponding to a predetermined point in the projected and displayed image may serve as the reference synchronization signal. Alternatively, it can be checked how much time lag is there between the timing based on the refresh rate of the projected image (the cycle in which all signals of a projected image are updated), for example, the timing 1/60 sec after the start of display of an image, and the timing when the light receiving device receives the infrared light thus, the reference synchronization signal is not necessary.

As described above, in the information input and output apparatus of the present exemplary embodiment, the invisible light beam emitted from the light source device 5 radiating invisible light is deflected by the scanning device 3 so as to scan the surface to be scanned.

When the indicating device 15 is located within the scanning area of the drawing light beam, the invisible light beam reflected by a part of the indicating device 15 is received by the light receiving device 10. From the signal obtained in the light receiving device 10, the light receiving timing is obtained. Using the light receiving timing, the information of the image to be formed on the surface 4 to be scanned is controlled.

In the present exemplary embodiment, the drawing light beam Lr and the position detecting light beam Lf are combined, and the scanning device optically scans the same position on the screen with the light beams Lr and Lf at the same time. However, the present invention is not limited to this. If the relative relationship between the drawing light beam Lr and the position detecting light beam Lf is known, the display can be performed in a timing such that the time lag between the light beams Lr and Lf is taken into account.

The accuracy of the indicated-position detection in the case where the apparatus is used as an information input apparatus will be described. In a conventional method, the distance to a writing device is measured using two floodlight units, and the position coordinate is thereby identified. However, this method is not suitable for the apparatus because in the case where the apparatus is incorporated in portable devices which are used anywhere, it is necessary to always carry two floodlight units. In addition, it is difficult to accurately dispose the two floodlight units so as to correspond to the axial direction of the display screen when the apparatus is used. Therefore, it is difficult to accurately detect the position coordinate.

In at least one method used in the present exemplary embodiment, both the image display and the indicated-position detection are performed by a two-dimensional scanning method.

The image displaying apparatus and the information input and output apparatus can be integrated, and the drawing light beam and the position detecting light beam can be optically scanned by the same scanning device at the same time.

The indicated position to be identified can be located in the scanning image displayed by the scanning information input and output apparatus. Therefore, for identifying the indicated position, one can detect the relative relationship with the scanning image.

In the present exemplary embodiment, the drawing light beam Lr and the position detecting light beam Lf can be combined, and the same position on the screen can be optically scanned with the light beams Lr and Lf at the same time by the scanning device. Therefore, the indicated position can be accurately identified by just synchronizing the light receiving timing with the video signals. The video signals are based on the frame synchronization signal. Therefore, in the case of the light receiving timing, the time from the frame synchronization signal is also measured. In this way, the information input and output apparatus can always accurately identify the indicated position regardless of the disposition accuracy of the position detecting device.

The image displaying apparatus and the information input apparatus can be integrated, and both apparatuses can use a two-dimensional scanning method. Therefore, the obtained information can be time (the number of counts). Therefore, the information input apparatus and the scanning information input and output apparatus can achieve relatively high detection accuracy and high processing speed.

It is not necessary to dispose indicated-position-information detecting devices around the scanning image, and therefore a compact and highly portable scanning information input and output apparatus can be obtained.

In addition, in the present exemplary embodiment, one can include a device for storing new image information such that the handwritten information is added to the original image information by the indicating device. In this case, when the handwritten information is added by the indicating device, it is desirable to store the new image information in the form of software for presentation, having the function corresponding to the manner of adding the handwritten information.

Exemplary Embodiment 2

Figure 8A:
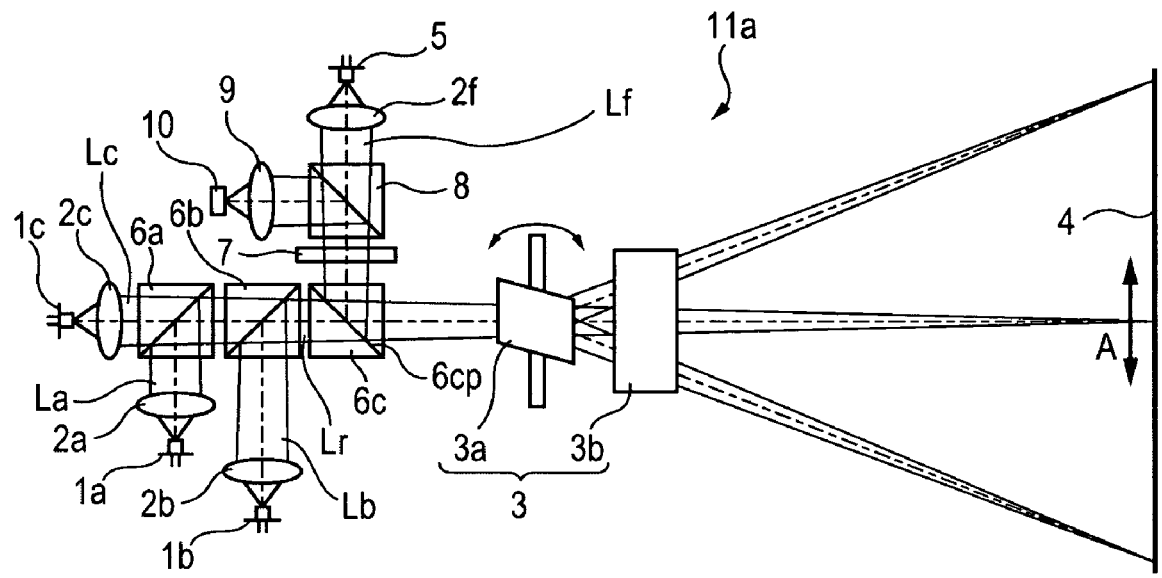
FIGS. 8A and 8B are sectional views of an information input and output apparatus in accordance with exemplary embodiment 2.
Figure 8B:
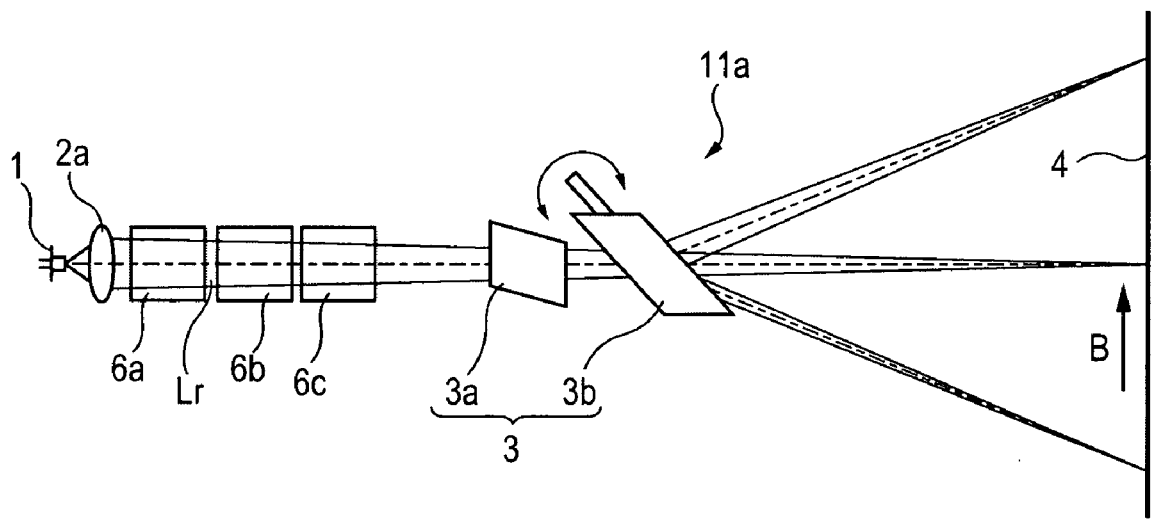

FIGS. 8A and 8B are a horizontal sectional view and a vertical sectional view, respectively, of a scanning information input and output apparatus 11a according to exemplary embodiment 2.

The difference between the present exemplary embodiment and exemplary embodiment 1 is that the drawing light beams are laser beams in three colors, red, green, and blue, where a color scanning image can be displayed.

In FIGS. 8A and 8B, the light source device 1 includes, for example, a red semiconductor laser 1a radiating red light, a blue semiconductor laser 1b radiating blue light, and a green laser 1c radiating green light. The laser light source devices 1a, 1b, and 1c emit color laser beams La, Lb, and Lc, respectively. Collecting lenses 2a, 2b, and 2c cause the color laser beams La, Lb, and Lc, respectively, to form spot images on the surface 4 to be scanned, through several members. The red laser beam La emitted from the red semiconductor laser 1a is incident on a dichroic mirror 6a, and can be combined with the green laser beam Lc emitted from the green laser light source 1c so as to form a yellow laser beam. The yellow laser beam is incident on another dichroic mirror 6b, and can be combined with the blue laser beam Lb emitted from the blue semiconductor laser 1b so as to form a white laser beam. This white laser beam can serve as the drawing light beam Lr. The drawing light beam Lr passes through still another dichroic mirror 6c, and is then scanned in the two-dimensional direction by a scanning device 3 that includes a deflector 3a in the horizontal direction and a deflector 3b in the vertical direction. The screen 4 (the surface to be scanned) can be optically scanned, and a color two-dimensional scanning image can be formed.

Reference numeral 5 denotes a light source device for position detection, for example, an infrared semiconductor laser that radiates invisible infrared light. A position detecting light beam Lf emitted from the light source device 5 for position detection is incident on the dichroic mirror 6c as in exemplary embodiment 1, is combined with the drawing light beam Lr on the dichroic surface 6CP, and optically scans the screen 4 together with the drawing light beam Lr.

Other parts of the configuration is the same as that of exemplary embodiment 1 shown in FIG. 1.

Figure 9:
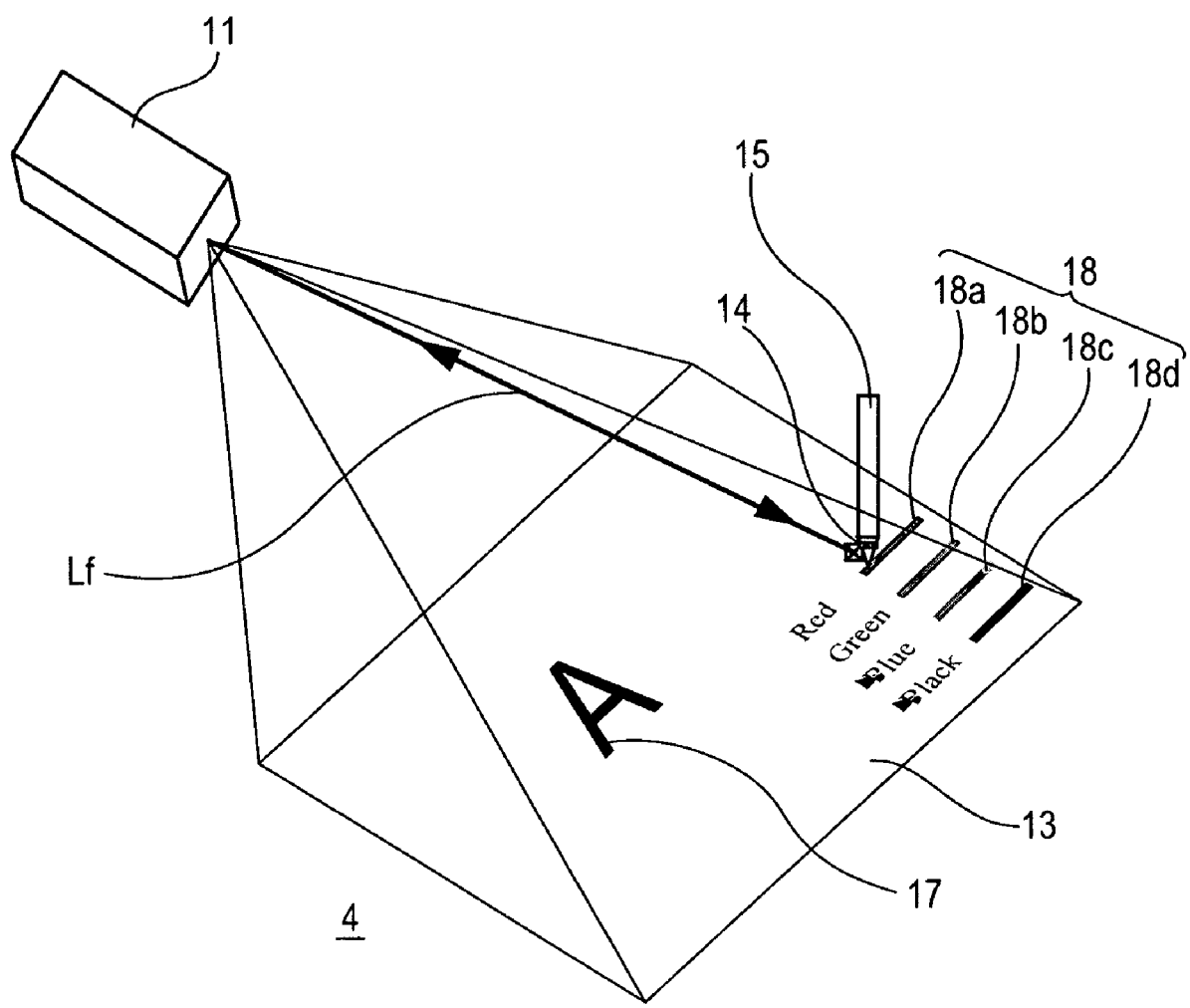
FIG. 9 is a schematic view of the information input and output apparatus in accordance with exemplary embodiment 2.

FIG. 9 is a schematic view of the scanning information input and output apparatus 11a of FIG. 8.

In the information input and output apparatus 11a of the present exemplary embodiment, the handwritten information 17 in the scanning image 13 can be displayed in a selected color.

At one end of the scanning image 13, icons 18 (18a, 18b, 18c, and 18d) for selecting the color are displayed. Four icons 18 for selecting the color, for example, an icon 18a for the red color, an icon 18b for the green color, an icon 18c for the blue color, and an icon 18d for the black color can be provided. After selecting one icon with the indicating device 15, writing is performed in the scanning image 13 except for the icons, and the handwritten information 17 is displayed on the screen 4 in the selected color.

Figure 10:
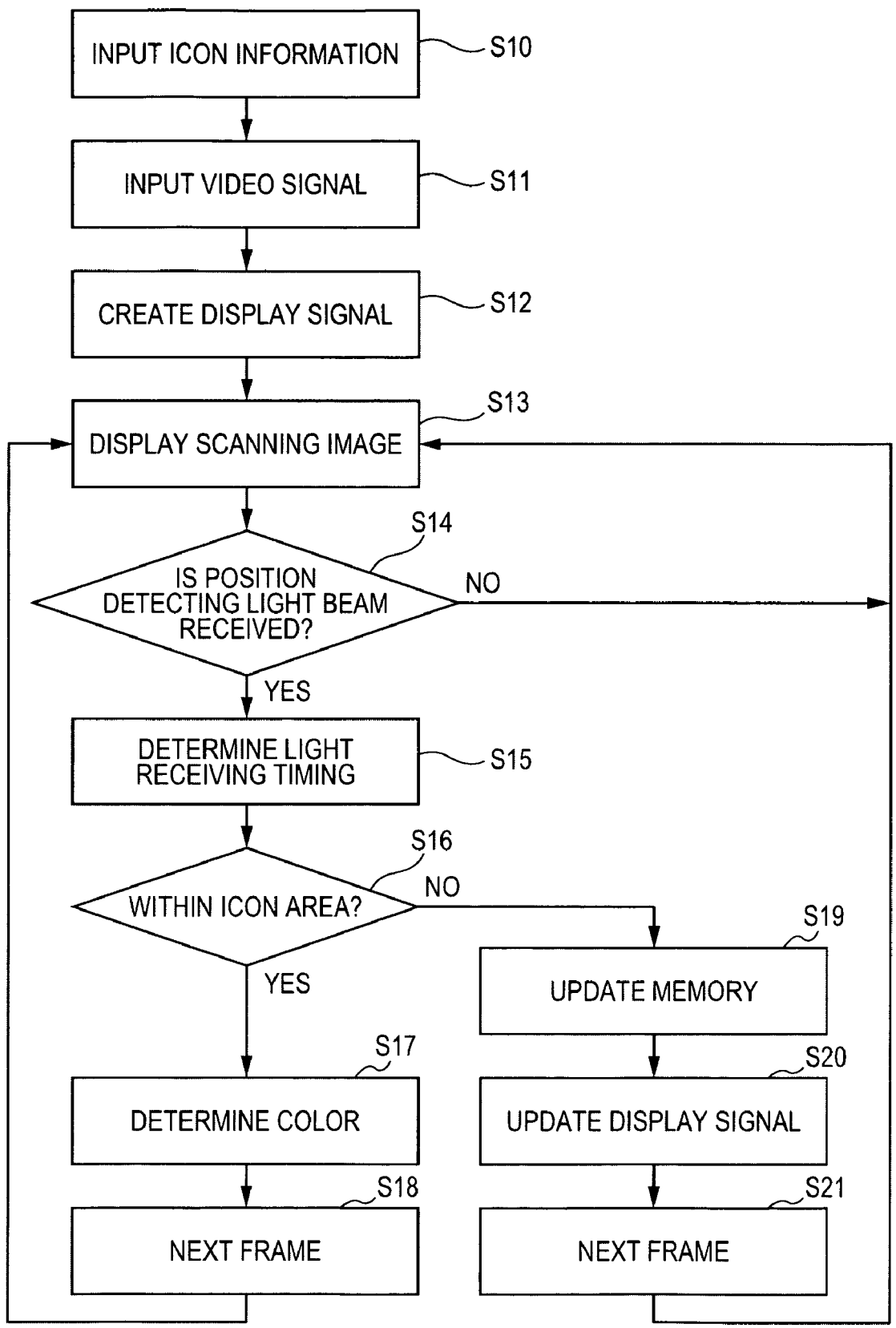
FIG. 10 is a flowchart of a method in accordance with at least one exemplary embodiment.

FIG. 10 is a flowchart of a system for coloring the handwritten information in the present exemplary embodiment.

First, icon information is stored (S10) in a memory device in the information input and output apparatus 11a. Next, display signals are created (S12) from the video signals, which have been inputted (S11), and the memory information. A scanning image including the icons 18 is displayed (S13). Next, the user indicates any one of the icons 18 in the scanning image 13 with the indicating device 15. The position detecting light beam Lf returning from one of the corner cubes 14 of the indicating device 15 is received by the light receiving device 10 located inside the information input and output apparatus 11 (S14). The time from the frame synchronization signal serving as the reference synchronization signal to the light receiving timing when the light receiving device 10 receives light is measured (S15).

On the basis of the obtained information, a determination device determines whether the icon area is indicated or not (S16). If, for example, the red icon 18a is first indicated, the determination is "YES", and it is determined that the following handwritten information is to be displayed on the screen 4 in the red color, i.e. the color is determined (S17).

In the next frame (S18), the same scanning image as the previous frame is displayed.

At this time, if the position detecting light beam Lf is not received from the indicating device 15, the same scanning image is displayed again. This is repeated until the position detecting light beam Lf is received by the light receiving device 10.

Next, the user indicates the area except for the icons 18 with the indicating device 15.

At that time, the light receiving device 10 receives the position detecting light beam Lf, and the time (detection time) from the frame synchronization signal to the light receiving timing is measured. If the determination device in the information input and output apparatus confirms that the indicated position is out of the icon area, the determination is "NO." Since the indicated position is the handwritten information, the indicated position is stored in the memory device together with the icon information (S19). In the following frame, the information stored in the memory device is read out, and the display of the handwritten information is performed (S20). Then the process continues to the next frame (S21).

As described above, in the present exemplary embodiment, the determination device determines whether the position on the surface to be scanned, that is obtained from the detection time, is within a specific area.

Specifically, display signals are newly created from the video signals of the following frame and the memory information. On the basis of the display signals, the drawing light beam is modulated. In this way, a scanning image including the handwritten information can be displayed. The indicated-position detection is repeated so as to update the memory information, and the locus of the indicated position is stored. In this way, the handwritten information can be displayed on the screen 4 in the color selected with the icon 18.

As described above, the information input and output apparatus (e.g., 11 and/or 11*a*) can be a system such that the user can indicate a position in the scanning image and can act on the basis of the information displayed at the position. In the present exemplary embodiment, time-series information can be obtained in the indicated-position detection as in exemplary embodiment 1. By synchronizing the light receiving timing with the video signals, the indicated position can be identified. Therefore, the time from the frame synchronization signal to the light receiving timing is measured.

Next, the determination by the determination device will be described.

Figure 11:
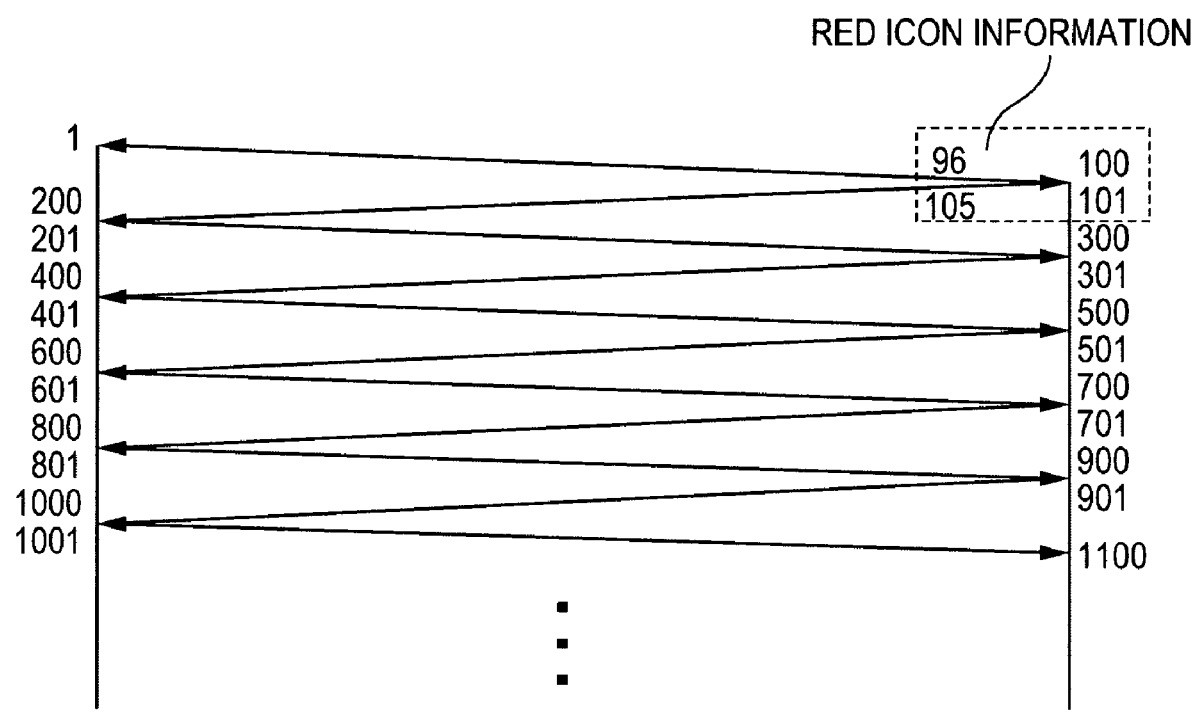
FIG. 11 is a schematic view of a scanning image in accordance with exemplary embodiment 2.

FIG. 11 is a schematic view of a scanning image on the screen 4.

All pixels in the scanning image are arranged in time series. Areas can be recognized on the basis of the time-series information. In the case where a counter that counts, for example, 100 per scanning line is used, the count numbers 1 to 100 designate the uppermost scanning line. When number 1 is the left end, number 100 is the right end. The second scanning line is designated by count numbers 101 to 200. Since reciprocating scanning is performed in the present exemplary embodiment in the horizontal scanning direction, number 101 is the right end and number 200 is the left end. For example, in the first and second scanning lines from the top, when five counts from the right end are set as an area, the area is designated by numbers 96 to 105.

If the count (time) from the frame synchronization signal to the light receiving timing measured in the indicated-position detection using the indicating device 15 and the light receiving device 10 is within this count range (numbers 96 to 105), the determination is "YES", and if it is out of the range, the determination is "NO."

The determination is performed in every color icon area so as to determine what color is selected. As described above, in the determination process, it is also possible to determine on the basis of the time-series information such as a count. Since only the time-series information can be consistently used, processing time can be reduced.

Figure 12A:
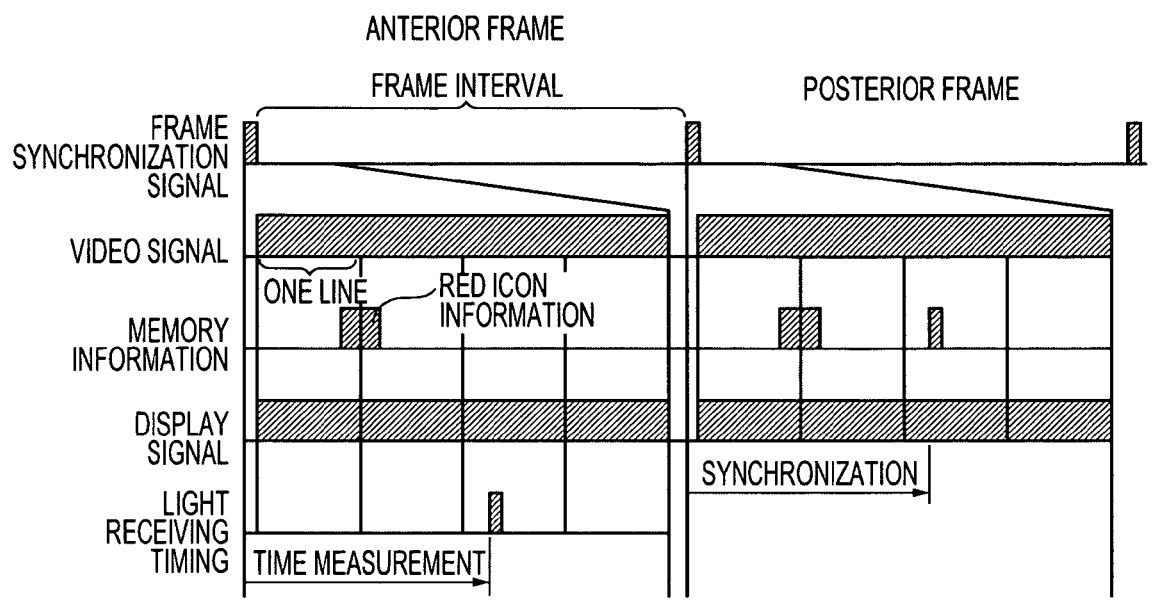
FIGS. 12A and 12B illustrate the creation of display signals in accordance with exemplary embodiment 2.
Figure 12B:
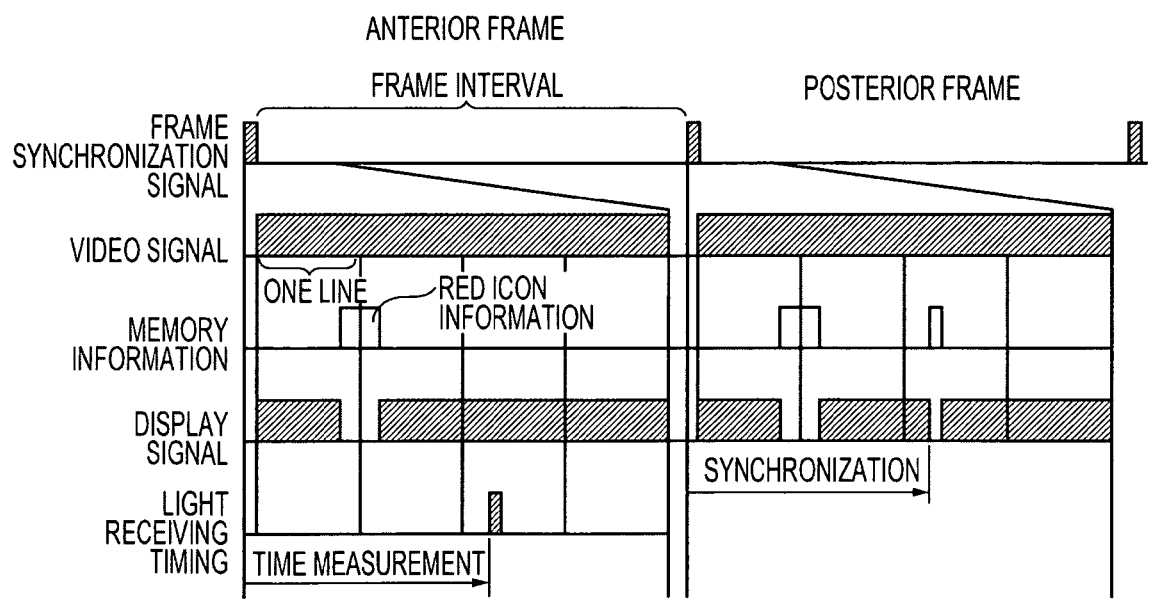

FIGS. 12A and 12B illustrate creation of display signals.

In this case, the handwritten information is written in the red color on a white screen. FIG. 12A shows the states of various signals of the red laser light source (1*a*). FIG. 12B shows the states of various signals of the blue laser light source (1*b*) and the green laser light source (1*c*). FIGS. 12A and 12B each show the states of various signals in two contiguous frames.

The frame synchronization signal serving as a reference synchronization signal is generated at intervals of 1/60 (sec). The left side shows the anterior frame, and the right side shows the posterior frame. The anterior frame shows the indicated-position detecting process in which the indicated position is detected when all video signals are ON and an entirely white scanning image is displayed. The posterior frame shows the color-handwritten-information displaying process in which the handwritten information is displayed in the red color in an entirely white scanning image.

First, the indicated-position detecting process on the left side of FIG. 12A will be described. As shown in FIG. 12A, all video signals of the red laser light source 1*a* are ON. For the memory information, ON signals are input in order to display the right end of the first and second scanning lines (count numbers 96 to 105) in the red color for the display of the icon 18*a* for selecting the red color. From the video signals and the memory information, display signals for the red color are created.

As shown in FIG. 12B, for the blue laser light source 1*b* and the green laser light source 1*c*, all video signals are also ON. For the memory information, OFF signals are input in order to display the right end of the first and second scanning lines (count numbers 96 to 105) in the red color for the display of the icon 18*a* for selecting the red color. From the video signals and the memory information, display signals for the red color are created. In this way, an image such that the icons 18 for color selection are displayed on a white background is displayed on screen 4.

For the light receiving timing, the timing when a part of the scanning image is indicated by the indicating device 15 and the position detecting light beam is detected by the light receiving device 10 is shown. The time (interval) or count number from the frame synchronization signal is obtained, and the indicated position can be identified. Next, the color-handwritten-information displaying process on the right side will be described.

As shown in FIG. 12A, all video signals of the red laser light source 1*a* remain ON. For the memory information, ON is added so that the red laser emits light in a timing synchronized with the detection timing, and the memory information is updated. This is reflected in the display signals, and the display signal is also updated. However, since all video signals of the red laser light source 1*a* are ON from the first, there is no change in the display signals. As shown in FIG. 12B, all video signals of the blue laser light source 1*b* and the green laser light source 1*c* are also ON. For the memory information, OFF is added so that the blue laser light source 1*b* and the green laser light source 1*c* are both turned off in a timing synchronized with the detection timing, and the memory information is updated. This is reflected in the display signals, and the display signal is also updated. In this way, in the case where the red color is selected and any area except for the color selection icons is indicated, the blue laser light source 1*b* and the green laser light source 1*c* are turned off in a timing synchronized with the light receiving timing so that the red color can be displayed at the indicated position.

Figure 13A:
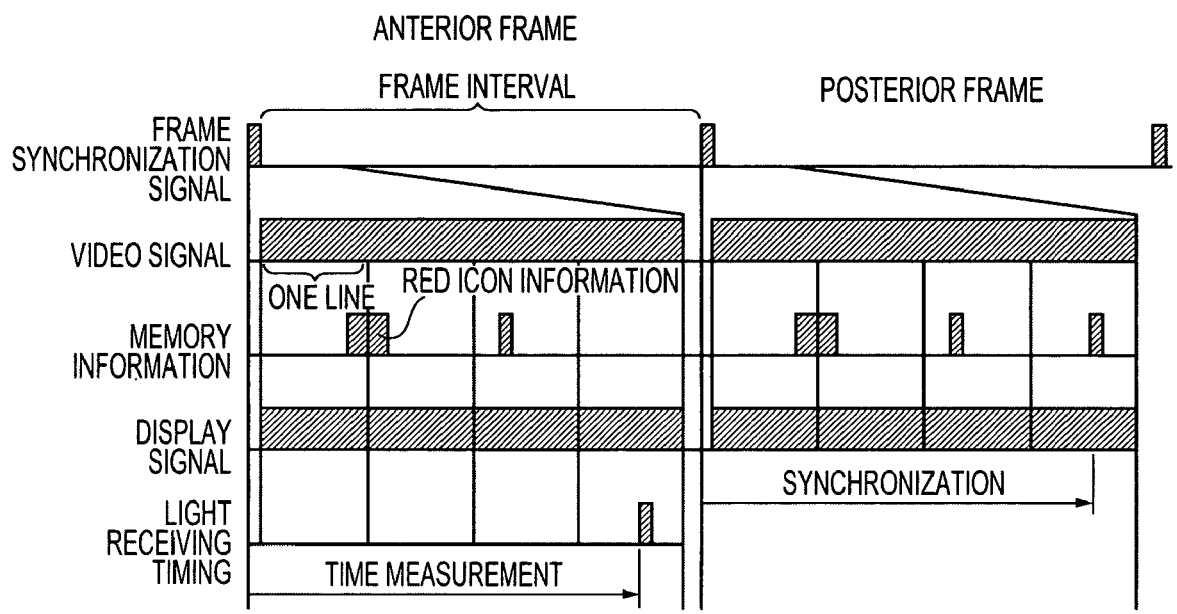
FIGS. 13A and 13B additionally illustrate the creation of display signals in accordance with exemplary embodiment 2.
Figure 13B:
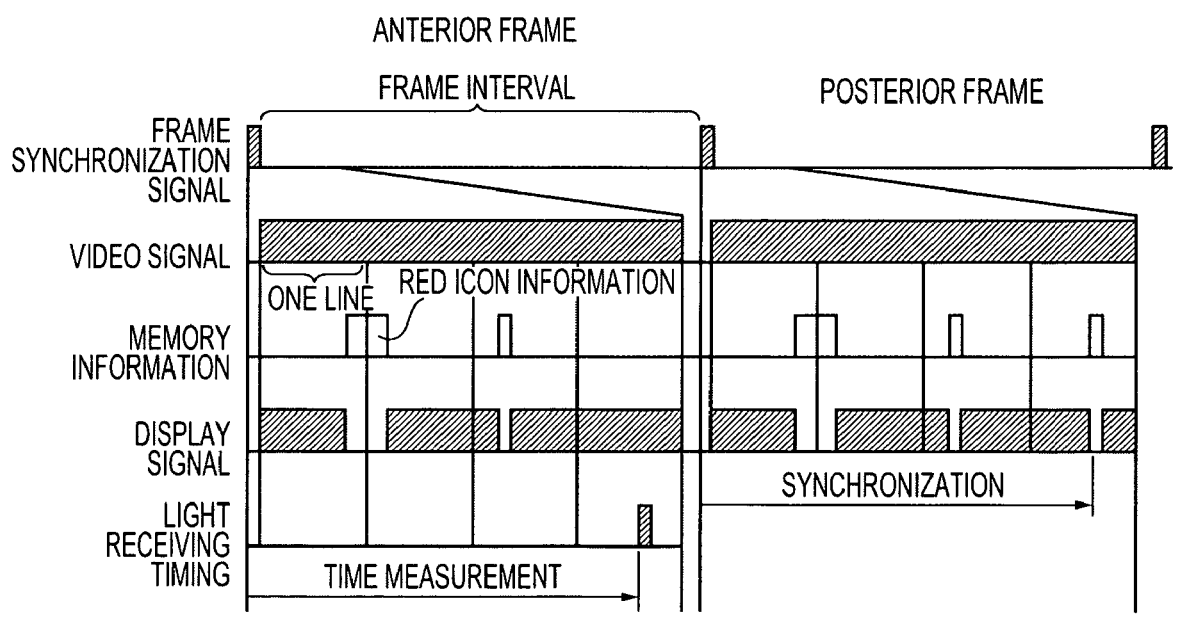

FIGS. 13A and 13B illustrate creation of display signals in the following frame.

FIG. 13A shows the states of various signals of the red laser light source 1*a*. FIG. 13B shows the states of various signals of the blue laser light source 1*b* and the green laser light source 1*c*.

The left side shows the same frame as that on the right side in FIGS. 12A and 12B, and the right side shows the next frame.

The frame on the left side will be described.

This shows a state in which the first point of the handwritten information is displayed in red and the position detecting light beam is received from the next indicated position. The position from which light is received is located on the next scanning line. The previous light receiving timing and this light receiving timing are symmetrical with respect to the boundary of scanning lines. This shows that a point just under the previously detected point is detected. The frame on the right side will be described.

On the basis of this indicated-position detection, the second point of the handwritten information is displayed. All video signals remain ON. For memory information, this detection information is added to the previous memory information (of the frame on the left side) so as to update the memory information. As a result, the display signals created from the video signals and the memory information are also updated so as to display the two points in the red color in addition to the icon for selecting the red color, and a red vertical line is displayed in the scanning image. By repeating this, the handwritten information can be displayed in the selected color.

Figure 14:
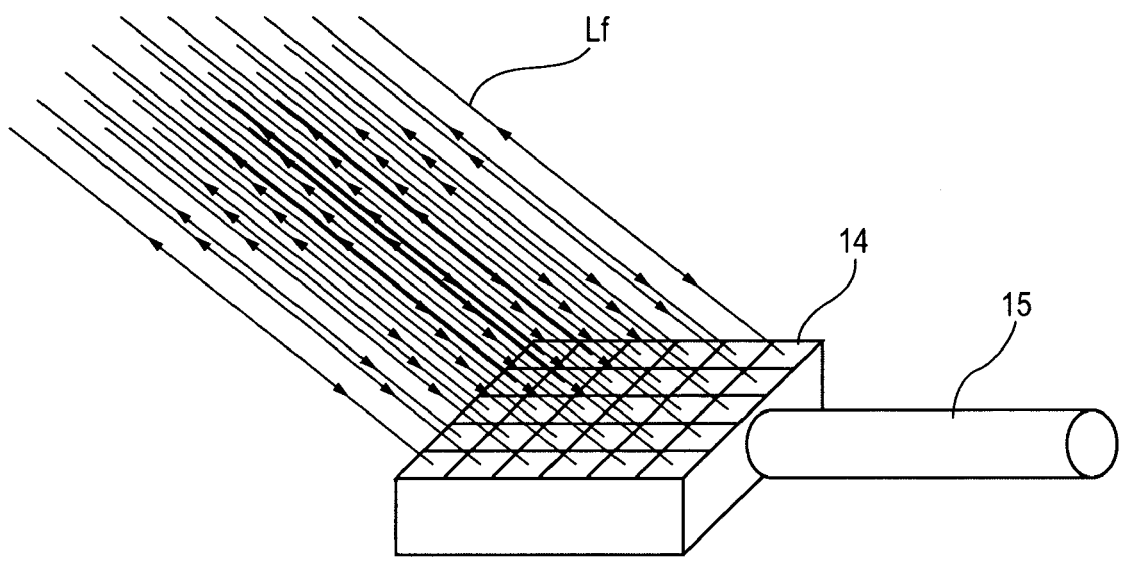
FIG. 14 illustrates an indicating device that erases handwritten information in accordance with exemplary embodiment 2.

FIG. 14 illustrates an indicating device that erases the handwritten information on the screen 4.

In the case of erasing the handwritten information, detailed positional information is not always needed. Therefore, for example, as shown in FIG. 14, an indicating device 15 such that many corner cubes 14 are provided on a surface can be used. Although not shown, an erasing icon is selected in advance on the screen 4 so as to erase the handwritten information at the position indicated next. When the indicating device 15 is used in this mode, the position detecting light beams incident on the many corner cubes 14 return to the information input and output apparatus, and are received one after another by the light receiving device inside the information input and output apparatus.

Figure 15:
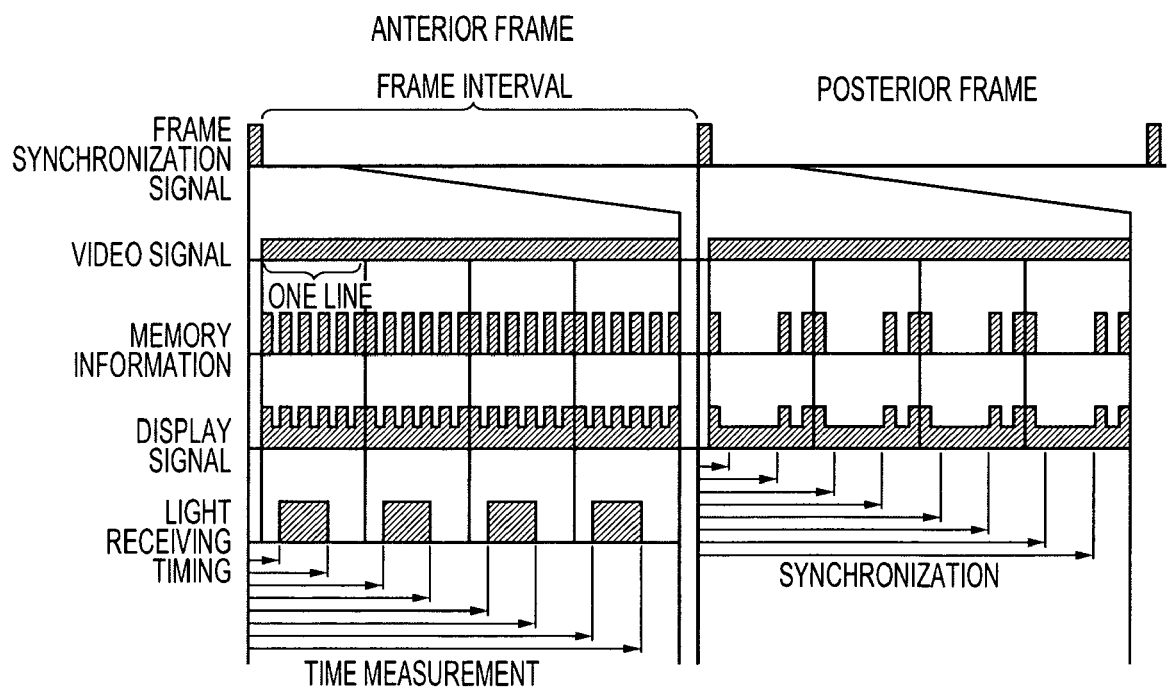
FIG. 15 illustrates the light receiving timing in accordance with exemplary embodiment 2.

FIG. 15 illustrates the light receiving timing of the position detecting light beam for erasing.

The left side shows a state in which a scanning image is displayed and position detecting light beams are received. The video signals are signals that display the entire area in half value. The handwritten information is stored in the memory information and is a signal repeating ON and OFF. Display signals are created from the video signals and the memory information, and an image such that a vertical stripe image is drawn in the half value is displayed.

The user indicates the position where the handwritten information to be erased is located, with the indicating device 15 which can have many corner cubes 14. The position detecting light beam Lf can undergo a number of retro-reflections in the corner cubes 14, and the position detecting light beam Lf can be continuously received by the light receiving device 10. Focusing attention on the timings when the continuous light receiving starts and ends, the time from the frame synchronization signal to the starting timing and the time from the frame synchronization signal to the ending timing are measured. In this way, the indicated-position detection in a series of pixels can be easily performed. By repeating this a plurality of times, many positions can be identified in a frame. In the next frame, the memory information is updated on the basis of the detection information. In this way, a scanning image from which the handwritten information at the position indicated by the indicating device 15 is erased can be displayed.

As described above, by integrating an image displaying apparatus and an information input and output apparatus and by using a two-dimensional scanning method in both apparatuses, information can be obtained in the form of time (count number), and detection of a series of positions can be handled in a lump using the starting timing and the ending timing. Therefore, the amount of information to be processed can be reduced, and the accuracy of the indicated-position detection can be improved.

As described above, by using the present exemplary embodiment, a system such that the user can write or erase the handwritten information in a scanning image using the information displayed in the scanning image can be achieved.

Exemplary Embodiment 3

Figure 16:
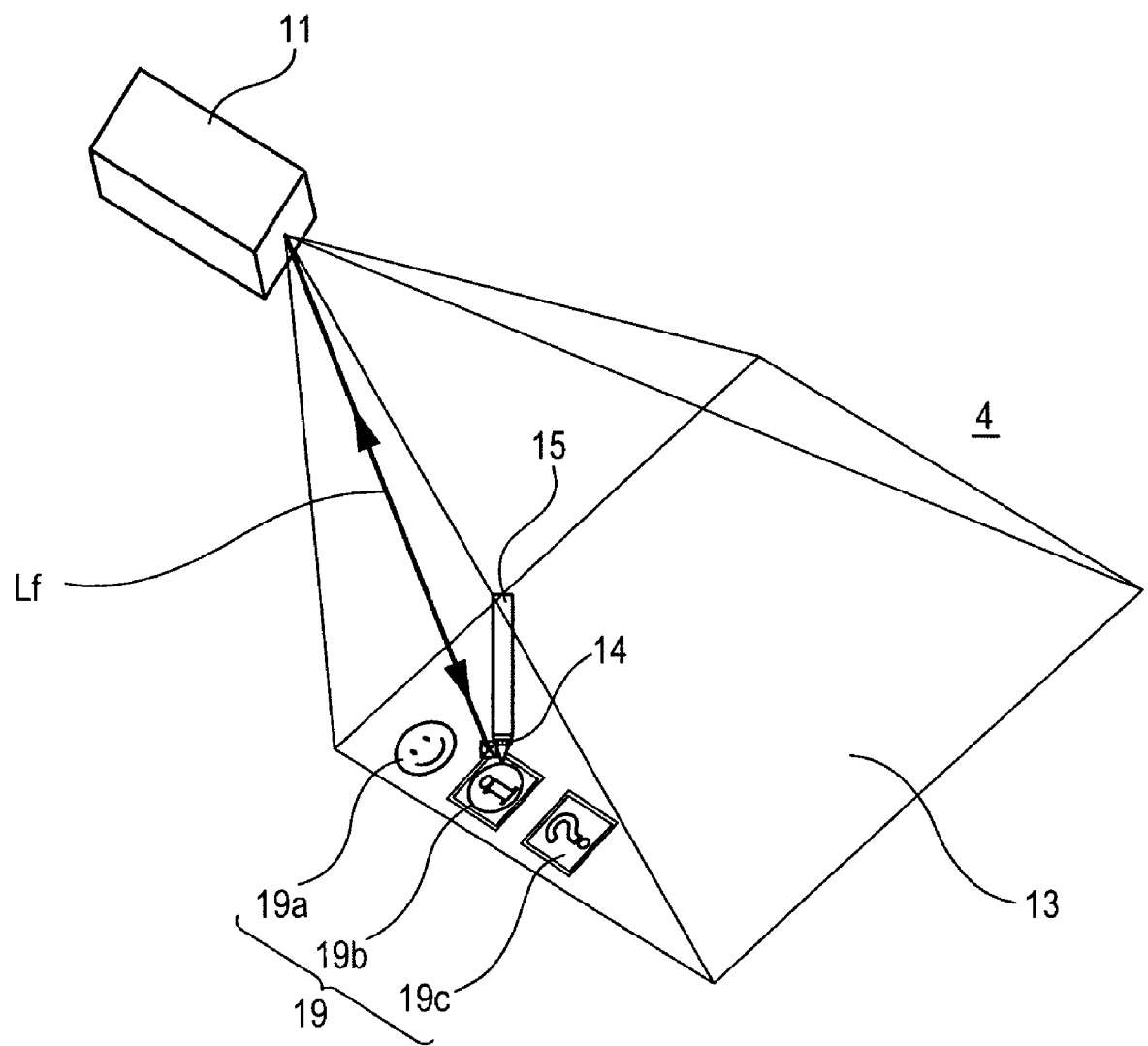
FIG. 16 is a schematic view of an information input and output apparatus in accordance with exemplary embodiment 3.

FIG. 16 is a schematic view showing image formation of a scanning information input and output apparatus according to exemplary embodiment 3.

In FIG. 16, reference numeral 11 denotes a scanning information input and output apparatus. As in exemplary embodiment 2, the present exemplary embodiment also can include three color (red, green, and blue) laser light sources. After combining the three color light beams emitted from the light sources into a drawing light beam using a combining unit, the present exemplary embodiment can scan the drawing light beam in the two-dimensional direction so as to optically scan the screen 4. By optically modulating the three color laser light sources according to display signals, a color scanning image 13 is displayed on the screen 4.

The information input and output apparatus 11 can display icons 19 (19a, 19b, and 19c) in a part of the projected and displayed scanning image 13. The icons 19 can vary and for this non limiting example are, a game icon 19a, a notebook icon 19b, and a help icon 19c. When the user indicates any one of the areas where icons 19 are displayed using the indicating device 15, the information input and output apparatus 11 detects the indicated position and determines that the indicated position is within the icon area 19. The present exemplary embodiment can have a function that performs the next operation (for example, to open a window and to run a file).

Figure 17:
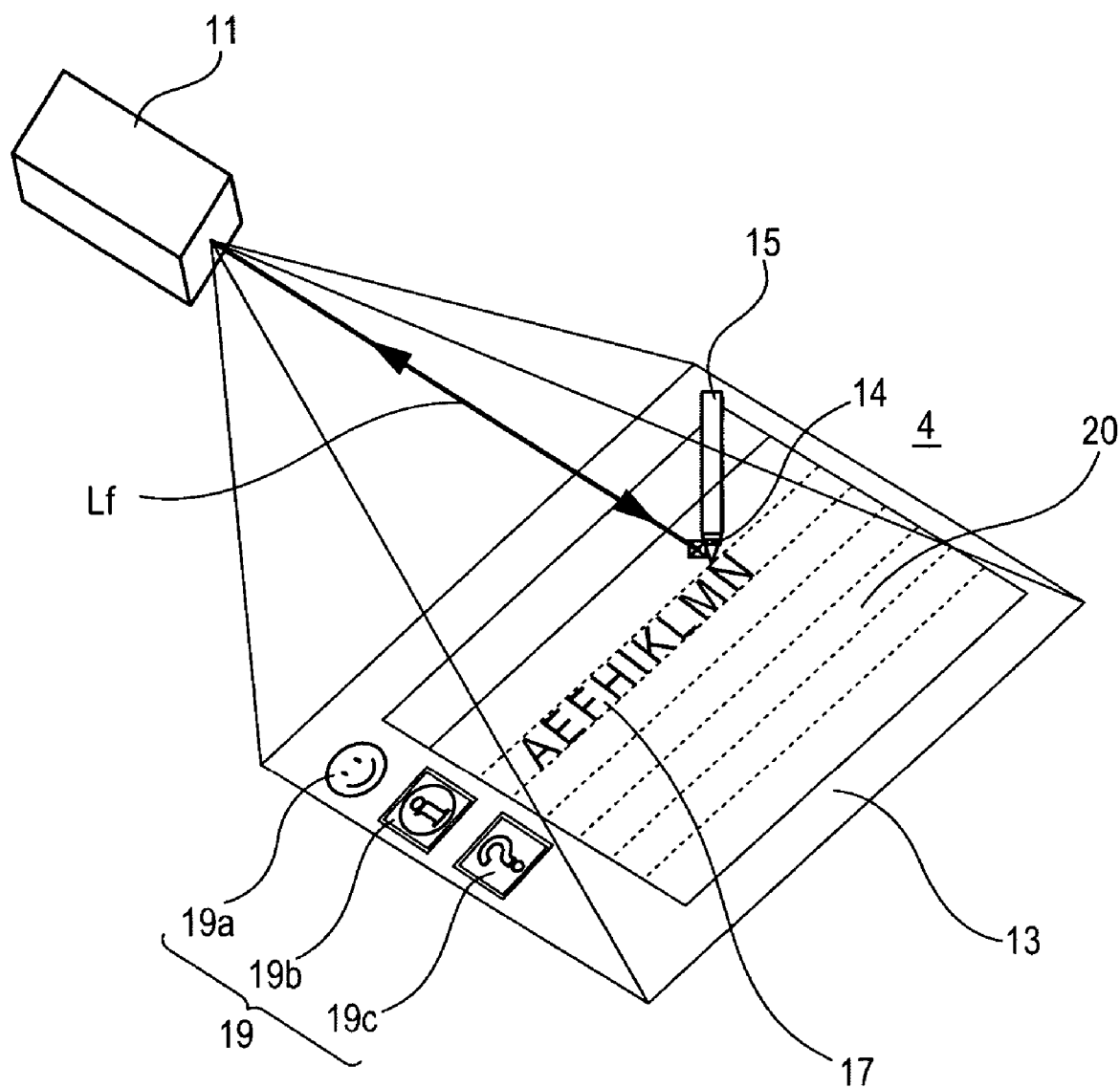
FIG. 17 is a schematic view of an information input and output apparatus in accordance with exemplary embodiment 3.

FIG. 17 is a schematic view of image formation by the information input and output apparatus 11 according to the present exemplary embodiment.

In the present exemplary embodiment, as a result of indicating the notebook icon 19b using the indicating device 15, a notebook window 20 is opened in the scanning image 13. The user can write handwritten information 17 in this notebook window 20 using the indicating device 15. As described above, the information input and output apparatus 11 includes an indicated-position recognizing device that recognizes that the user indicates a particular area. Therefore, information can be exchanged between the user and the information input and output apparatus.

If the information input and output apparatus 11 has a personal computer function, instead of a monitor, the scanning image 13 output from the information input and output apparatus 11 can be used, and instead of a mouse or a keyboard, the indicating device 15 can be used. Therefore, the size of the body is dramatically reduced, and a pocket-size portable personal computer can be achieved. In addition, an information input and output apparatus 11 in which the user can perform information input as if it were handwriting can be achieved.

Exemplary Embodiment 4

Figure 18:
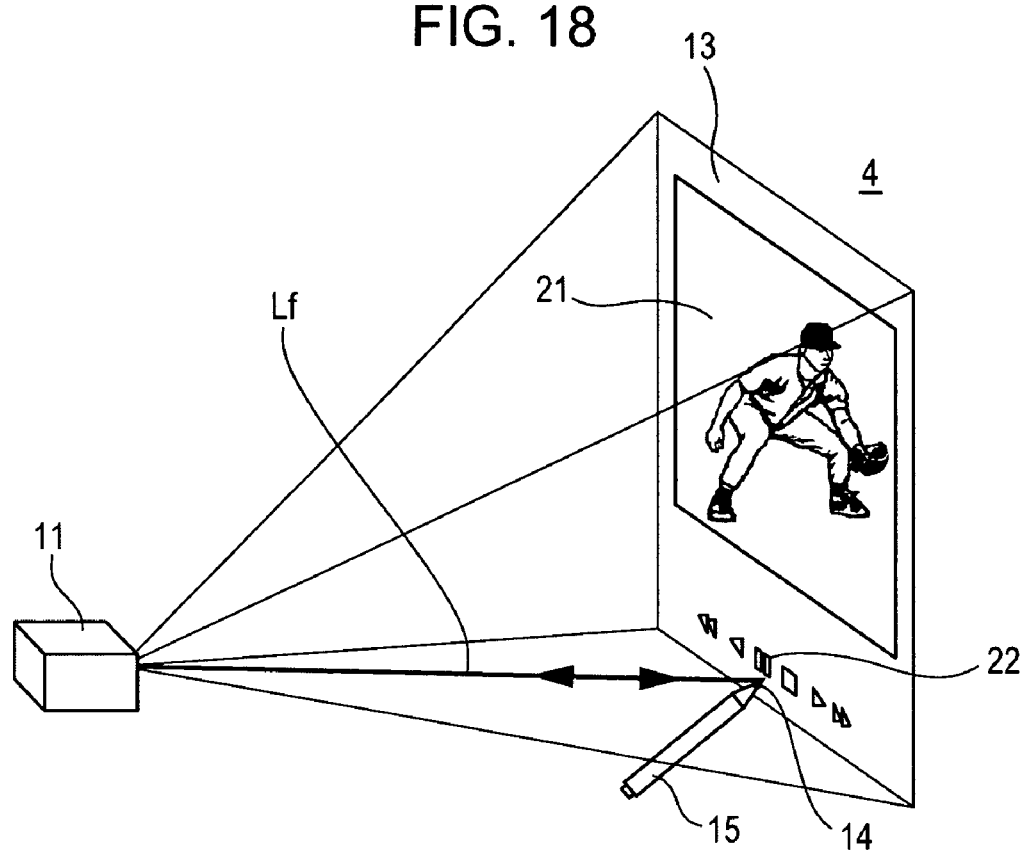
FIG. 18 is a schematic view of an information input and output apparatus in accordance with exemplary embodiment 4.

FIG. 18 is a schematic view showing image formation in a scanning information input and output apparatus according to exemplary embodiment 4.

The information input and output apparatus 11 can have a projector function, as an information output apparatus, and can project and display large-size image information 21 from a small body. In addition, since a laser is used as a light source device, the color reproduction range is wide. Therefore, the information input and output apparatus 11 can be used as a portable display for watching a movie or television.

On the other hand, as an information input apparatus, the information input and output apparatus 11 can accurately obtain the position on the screen 4 indicated with the indicating device 15. In the present exemplary embodiment, icons 22 are displayed in a part of the scanning image 13. The user indicates one of the icons 22 with the indicating device 15. The information input and output apparatus 11 can detect the indicated position and identify the scanning position.

As a result, the information input and output apparatus 11 recognizes that the user indicates the area of the icon 22, and then performs, for example, the following operations.

In the case of the present exemplary embodiment, icons 22 of playback, stop, pause, fast-forward, and fast-rewind are displayed in the scanning image 13. In FIG. 18, the pause icon is indicated. Therefore, the information input and output apparatus 11 recognizes that the user indicates the area of the pause icon, and pauses the video playback.

Figure 19A:
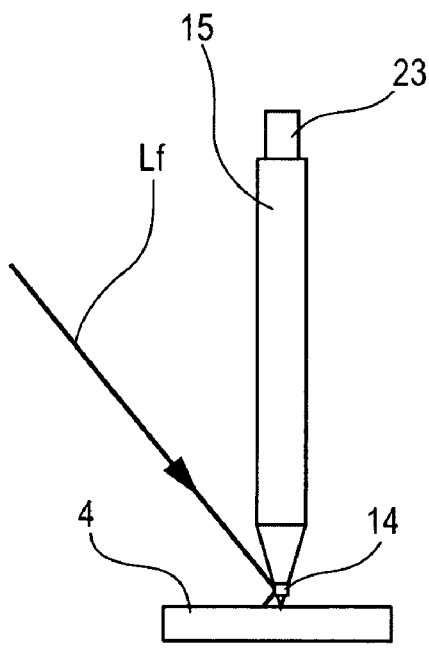
FIGS. 19A and 19B illustrate an indicating device in accordance with exemplary embodiment 4.
Figure 19B:
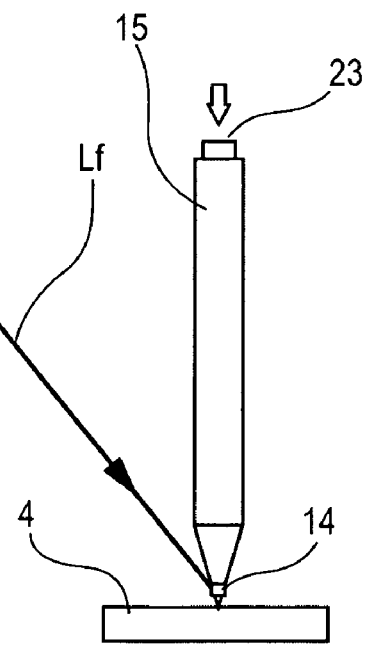

FIGS. 19A and 19B illustrate an indicating device 15 of the present exemplary embodiment. The indicating device 15 performs selective indicated-position detection.

FIG. 19A illustrates the OFF state in which retro-reflection is not performed by the retro-reflecting members 14. FIG. 19B illustrates the ON state in which retro-reflection is performed by the retro-reflecting members 14.

Around the tip of the indicating device 15, corner cubes 14 serving as retro-reflecting members are attached. In FIG. 19A, the position detecting light beam Lf is reflected by a shutter provided in front of the corner cubes 14. Therefore, retro-reflection is not performed.

On the other hand, in FIG. 19B, a button 23 attached to the indicating device 15 is pressed, and the shutter is opened as shown in FIGS. 4C and 4D. Therefore, the position detecting light beam Lf is incident on and retro-reflected by one of the corner cubes 14, and is received by the light receiving device inside the information input and output apparatus 11. The time from the frame synchronization signal to the light receiving timing is measured, and the position indicated by the indicating device 15 is identified. The information input and output apparatus 11 determines that the indicated position is within the area of the pause icon, and pauses the video playback.

As described above, the indicating device 15 of the present exemplary embodiment has a selective position-detecting mechanism such that the shutter moves substantially vertically with the vertical motion of the button 23. By turning ON/OFF the button 23, selective indicated-position detection is performed so as to accurately read the position indicated with the indicating device 15.

In the present exemplary embodiment, the information input and output apparatus 11 can be used as a display, and the distance from the user to the screen 4 can be comparatively long. Therefore, when the user indicates one of the icons 22 with the indicating device 15, the user needs to approach the screen 4. This can be inconvenient.

Figure 20:
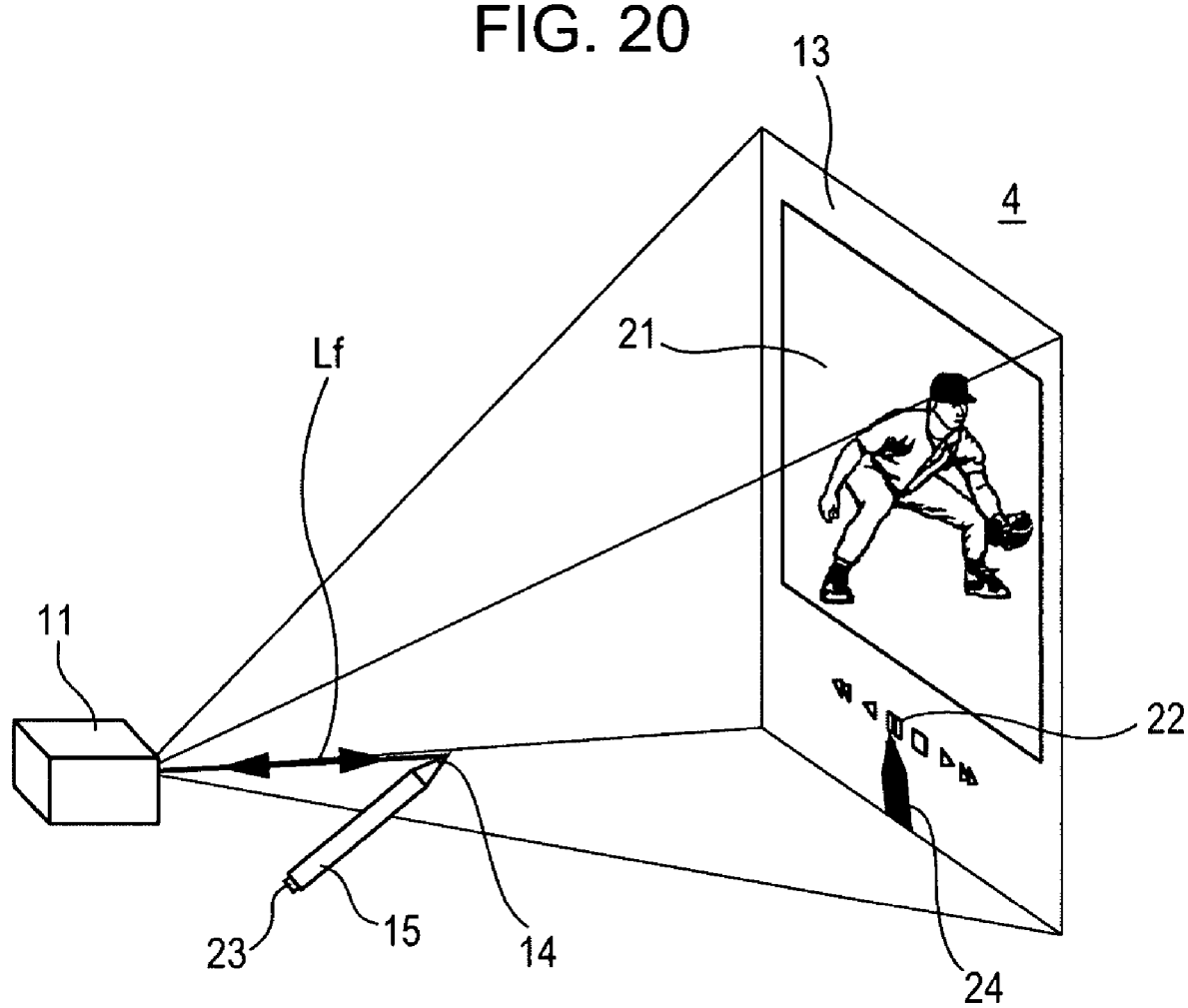
FIG. 20 is a schematic view of another form of the indicating device in accordance with exemplary embodiment 4.

To alleviate this inconvenience, another form of the indicating device 15 used in the present exemplary embodiment will be described with reference to FIG. 20. FIG. 20 is a schematic view of another form of the indicating device 15 of the present exemplary embodiment.

By turning ON/OFF the button 23, the indicating device 15 performs selective indicated-position detection. Therefore, the position detecting light beam Lf propagating through the space between the information input and output apparatus 11 and the screen 4 can be retro-reflected by one of the corner cubes 14 so as to return to the information input and output apparatus 11. By watching the shadow 24 of the indicating device 15 on the screen 4 and by indicating the position of the icon 22, the positional relationship with the scanning image 13 can be accurately grasped. The user presses the button 23 and causes the position detecting light beam Lf to undergo retro-reflection, and the timing when the light receiving device of the information input and output apparatus 11 receives the light beam Lf is detected. In this way, even when the user is far apart from the screen 4, the indicated position in the scanning image can be accurately detected. Depending on use, for example, for displaying handwritten information or for watching a movie, the desired direction of the scanning image differs.

Figure 21A:
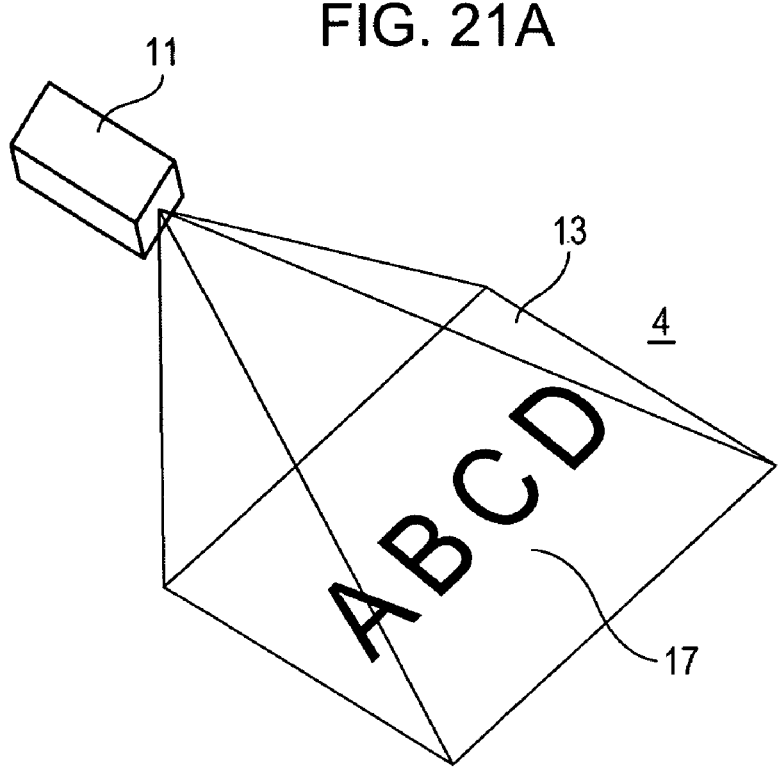
FIGS. 21A and 21B illustrate methods of projection in accordance with exemplary embodiment 4.
Figure 21B:
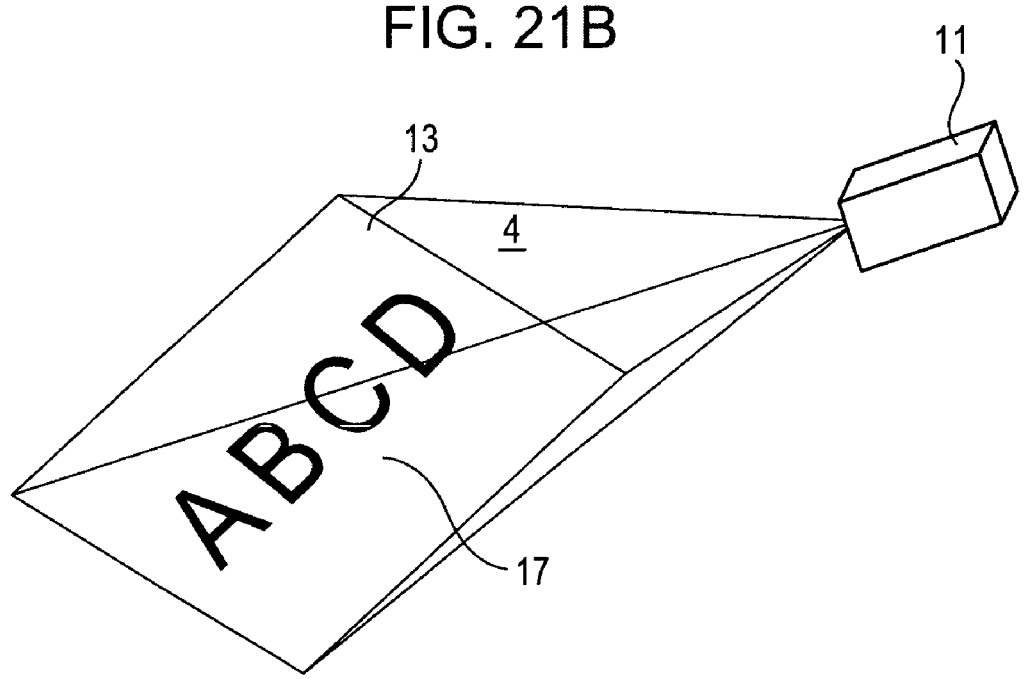

FIG. 21A shows the projection in the handwriting mode of the information input and output apparatus 11. FIG. 21B shows the projection in the display mode.

As shown in FIG. 21A, in the handwriting mode for writing in the scanning image, the information input and output apparatus 11 can be positioned such that an image is projected toward the user. On the other hand, as shown in FIG. 21B, when the information input and output apparatus 11 is used in the display mode for watching a movie or television, the information input and output apparatus 11 can be positioned at a position close to the user while projecting an image away from the user.

Therefore, the information input and output apparatus of the present exemplary embodiment has a function that can invert the direction of the scanning image.

Specifically, the information input and output apparatus can have a function to invert the rotation direction (scanning direction) of the deflector 3b shown in FIG. 8B and can vertically flip the displayed image 13. The vertical direction of the scanning image 13 can be determined by the order of scanning lines. That is to say, the vertical direction of the scanning image 13 can be determined by the rotation direction of the deflector 3b in the vertical direction. In order to invert the rotation direction of the deflector 3b, one can apply a reverse current to the motor of the deflector 3b. This can be achieved with a switch in the circuit.

Similarly, in the case where a transmissive screen is used, one can horizontally flip the scanning image.

Figure 22:
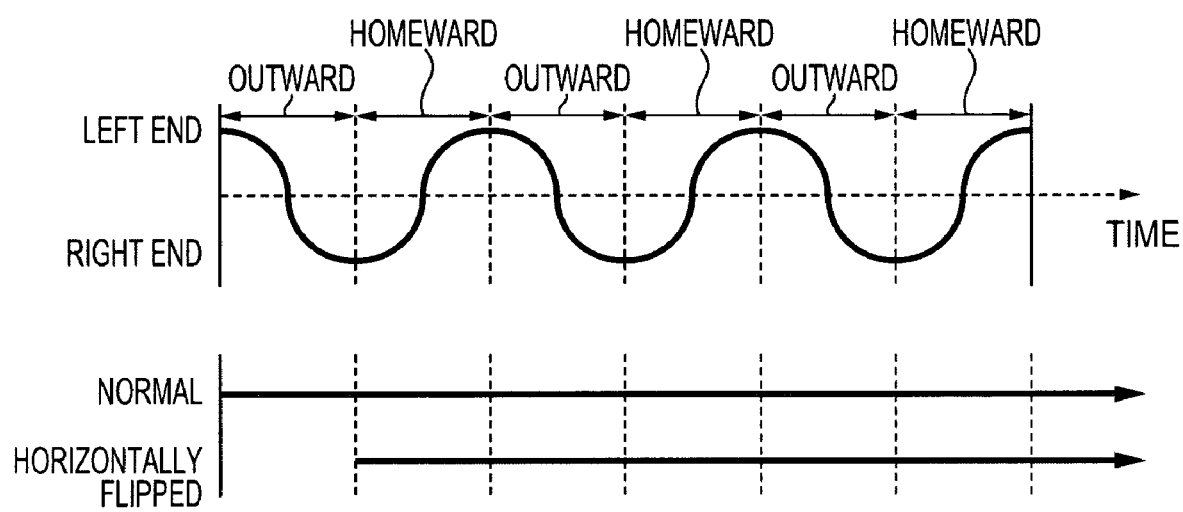
FIG. 22 illustrates a video signal in accordance with exemplary embodiment 4.

FIG. 22 illustrates the method for horizontally flipping the scanning image.

As shown in FIG. 8A, a resonating MEMS device can be used as the deflector 3a in the horizontal direction. Reciprocating scanning can be performed. Each cycle consists of an outward scanning and a homeward scanning. The present exemplary embodiment can have a mechanism that shifts the phase of a video signal $\pi$ (half a cycle) behind (or ahead) with respect to the cycle of the deflector 3a in the horizontal direction. Here, $\pi$ is half of the scanning cycle in the main scanning direction of the scanning device, more specifically, half of the resonance cycle of the MEMS of the horizontal deflector 3a. The mechanism is, in other words, a phase shifting mechanism or a delaying device. The information normally displayed in the outward scanning is displayed in the homeward scanning, and the information normally displayed in the homeward scanning is displayed in the outward scanning in the next cycle. As described above, by incorporating a mechanism that inverts the direction of the scanning image 13, a scanning information input and output apparatus capable of displaying an image tailored to the use or circumstance can be achieved. Particularly in the case of the handwriting mode, when a scanning image is projected toward the user, the information input and output apparatus does not obstruct the user. In addition, the shadows of the indicating device and the user's arm are hardly generated or are generated at a position where the user does not mind the shadows.

Therefore, the usability is improved. The scanning image can be projected onto the screen from the opposite direction from the user's dominant arm.

As described above, in the present exemplary embodiment, the scanning direction in which the scanning device scans the surface to be scanned can be changed with the changing device.

In each exemplary embodiment, retro-reflecting members can be provided in the indicating device. The retro-reflecting members reflect the position detecting light beam and return it to the scanning information input and output apparatus. However, the present invention is not limited to this. For example, scattering members can be used. In this case, the light receiving timing can also be detected. Scattered light has low intensity and is easily affected by noise such as outside light. However, if a specific signal (for example, a pulse signal) is applied to the position detecting light beam so as to identify the received light beam, the effect of noise can be eliminated.

The user's finger may be used as a substitute for the indicating device in each exemplary embodiment.

As described above, the scanning information input and output apparatuses (image displaying apparatuses, indicated-position recognizing apparatuses) of the above-described exemplary embodiments can detect an indicated position in a projected and displayed scanning image. In addition, the scanning information input and output apparatuses can display new information in the image on the basis of input information. Moreover, by performing both image display and indicated-position detection by an optical scanning method, it is possible to integrate an image displaying apparatus with an information input apparatus and to obtain a compact scanning information input and output apparatus. Furthermore, the scanning information input and output apparatuses can detect an indicated position without disposing indicated-position detecting devices, or regardless of the disposition accuracy of indicated-position detecting devices. In addition, an information terminal apparatus using these scanning information input and output apparatuses can be achieved.

Any combination of the above-described exemplary embodiments 1 to 4 is possible as long as the combination is consistent. Although the exemplary embodiments are described on the assumption that they are front projectors, of course, the exemplary embodiments can be applied to a rear projector.

The exemplary embodiments can detect a position indicated by the indicating device and can display a predetermined image at the position indicated by the indicating device, in a projected and displayed image. In addition, the exemplary embodiments can display new image information in the displayed image information on the basis of input information. Moreover, a compact information input and output apparatus can be obtained by integrating an image displaying apparatus that displays image information with an information input apparatus that detects a position indicated by the indicating device in a image. Furthermore, one can detect a position indicated by the indicating device without newly disposing indicated-position detecting devices for detecting the indicated position, or regardless of the disposition of indicated-position detecting devices.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-095746 filed Mar. 29, 2005, which is hereby incorporated by reference herein in its entirety.

What is claimed is:

1. An image displaying apparatus comprising:
   a drawing-light-beam projecting unit that projects a visible drawing light beam modulated on the basis of image information;
   a scanning device that two-dimensionally scans the visible light emitted from the drawing-light-beam projecting unit and invisible light on a surface to be scanned, forming a two dimensional image on the surface with the visible light;
   an indicating device that indicates a position within the two dimensional image on the surface; and
   a light receiving device that receives the invisible light deflected by the indicating device, wherein a light receiving timing of the received invisible light is obtained; and
   a position detecting device that obtains the position indicated by the indicating device in the two dimensional image on the basis of time lag between the timing based on a refresh rate of the two dimensional image and the timing when the light receiving device receives the invisible light.

2. The image displaying apparatus according to claim 1, wherein the image information is controlled in signal timing synchronized with the light receiving timing.

3. The image displaying apparatus according to claim 1, further comprising:
   a device that measures the time from generation of a reference synchronization signal to the light receiving timing, the reference synchronization signal serving as a standard for forming an image on the surface to be scanned.

4. The image displaying apparatus according to claim 1, wherein the invisible light is infrared light that has a peak wavelength in a range from 1.4 µm to 1.6 µm.

5. The image displaying apparatus according to claim 1, wherein the indicating device includes a mechanism that can select to deflect or not to deflect incident light in a direction substantially opposite to the direction of incidence.

6. The image displaying apparatus according to claim 1, wherein the indicating device includes a retro-reflecting member that reflects incident light in a direction substantially opposite to the direction of incidence.

7. The image displaying apparatus according to claim 1, wherein the drawing-light-beam projecting unit includes light sources that radiate color lights, wherein the color lights include red light, blue light, and green light, and the scanning device scans the color lights on the surface to be scanned so as to display a color image.

8. The image displaying apparatus according to claim 1, wherein the scanning direction of the scanning device is capable of being inverted.

9. The image displaying apparatus according to claim 1, further comprising a changing device capable of changing the direction in which the scanning device scans the surface to be scanned.

10. The image displaying apparatus according to claim 1, further comprising a device that shifts the timing when the drawing light beam is projected by half of a scanning cycle in the main scanning direction of the scanning device.

11. An image displaying apparatus comprising:
- a drawing-light-beam projecting unit that projects a visible drawing light beam modulated on the basis of image information;
- a scanning device that two-dimensionally scans the visible light emitted from the drawing-light-beam projecting unit and invisible light on a surface to be scanned, forming a two dimensional image on the surface with the visible light;
- an indicating device that indicates a position within the two dimensional image on the surface; and
- a light receiving device that receives the invisible light deflected by the indicating device, wherein a light receiving timing of the received invisible light is obtained; and
- a position detecting device that obtains the position indicated by the indicating device in the two dimensional image on the basis of time lag between the timing based on a reference synchronization signal, an image signal corresponding to a predetermined point in the two dimensional image serving as the reference synchronization signal, and the timing when the light receiving device receives the invisible light.

12. An image displaying apparatus comprising:
- a drawing-light-beam projecting unit that projects a visible drawing light beam modulated on the basis of image information;
- a scanning device that two-dimensionally scans the visible light emitted from the drawing-light-beam projecting unit and invisible light on a surface to be scanned, forming a two dimensional image on the surface with the visible light;
- an indicating device that indicates a position within the two dimensional image on the surface; and
- a light receiving device that receives the invisible light deflected by the indicating device, wherein a light receiving timing of the received invisible light is obtained; and
- a position detecting device that obtains the position indicated by the indicating device in the two dimensional image on the basis of time lag between the timing based on a frame synchronization signal generated at a frame interval and the timing when the light receiving device receives the invisible light.

* * * * *